(12) United States Patent
Shoolman et al.

(10) Patent No.: US 7,664,833 B2
(45) Date of Patent: Feb. 16, 2010

(54) SYSTEM AND METHOD FOR MANAGING MULTIPLE CONNECTIONS TO A SERVER

(75) Inventors: Yiftach Shoolman, Modiin (IL); Yigal Rappaport, Holon (IL); Yehuda Meiman, Rishon Letzion (IL)

(73) Assignee: Crescendo Networks, Ltd., Or Yehuda (IL)

( * ) Notice: Subject to any disclaimer, the term of this patent is extended or adjusted under 35 U.S.C. 154(b) by 660 days.

(21) Appl. No.: 11/003,305

(22) Filed: Dec. 3, 2004

(65) Prior Publication Data

US 2006/0020598 A1    Jan. 26, 2006

(51) Int. Cl.
   *G06F 15/16* (2006.01)
   *G06F 15/173* (2006.01)
(52) U.S. Cl. .................. 709/219; 709/227; 709/238
(58) Field of Classification Search ........... 709/206, 709/231, 227, 203, 226, 224, 219, 238
   See application file for complete search history.

(56) References Cited

U.S. PATENT DOCUMENTS

| | | | |
|---|---|---|---|
| 6,128,657 A * | 10/2000 | Okanoya et al. | 709/224 |
| 6,134,582 A * | 10/2000 | Kennedy | 709/206 |
| 6,308,238 B1 | 10/2001 | Smith et al. | |
| 6,463,454 B1 | 10/2002 | Lumelsky et al. | |
| 6,473,802 B2 | 10/2002 | Masters | |
| 6,549,934 B1 | 4/2003 | Peterson et al. | |
| 6,754,230 B2 * | 6/2004 | Purpura et al. | 370/468 |
| 6,757,255 B1 * | 6/2004 | Aoki et al. | 370/252 |
| 6,836,785 B1 * | 12/2004 | Bakshi et al. | 709/203 |
| 6,925,484 B2 * | 8/2005 | Fujimori et al. | 709/202 |
| 6,957,219 B1 * | 10/2005 | Lin et al. | 707/10 |
| 7,035,213 B2 * | 4/2006 | Moran et al. | 370/230 |
| 7,039,916 B2 * | 5/2006 | Jason, Jr. | 718/105 |
| 7,404,003 B1 * | 7/2008 | Noble | 709/236 |
| 2002/0026502 A1 | 2/2002 | Phillips et al. | |
| 2002/0091825 A1 * | 7/2002 | Shuster | 709/226 |
| 2003/0093520 A1 * | 5/2003 | Beesley | 709/224 |
| 2004/0133643 A1 * | 7/2004 | Warren et al. | 709/206 |

\* cited by examiner

*Primary Examiner*—William C Vaughn, Jr.
*Assistant Examiner*—Kristie D Shingles
(74) *Attorney, Agent, or Firm*—Byrne Poh LLP

(57) ABSTRACT

A method for managing connections between at least one client and at least one data server, said method comprises: (a) providing an intermediary connection apparatus comprising connections to a plurality of clients over a WAN or a LAN environment, said apparatus comprising memory buffers and at least one connection to each of said at least one data server(s) being continuously open; (b) establishing a client network connection between said apparatus and one of said clients via a network; (c) receiving a client request to receive a response from a data server over said client network connection; (d) forwarding to the data server either a request or a partial request; (e) limiting the size of the response or partial response that the server is allowed to provide at a given time to said apparatus in response to said client request; and (f) buffering data encoding requests and responses in said apparatus according to data traffic load over the connection to said server and to said client, respectively.

23 Claims, 16 Drawing Sheets

SYSTEM AND METHOD FOR MANAGING MULTIPLE CONNECTIONS TO A SERVER

BACKGROUND OF THE INVENTION

The amount of data that is exchanged over data networks is rapidly increasing. Multiple clients are connected over a variety of network connections established over various communication networks to data servers. Each data server is operable to host multiple (client) network connections. In a typical scenario, multiple clients are coupled via multiple Wide Area Network (WAN) channels to a data server for exchanging information. In a typical client-server environment, a significant portion of the data server computational resources are allocated for managing the large number of network connections. Accordingly, a substantial portion of the available resources that could be used for managing data retrieval and associated processes is used to manage the open network connections. Usually, a CPU of a data server maintains an open network connection until the information exchange ends. The information exchange includes sending information portions or segments over the network connections. Accordingly, the amount of open network connections that may be maintained by a data server is relatively limited, and results in an inefficient usage of the computational resources of the data server.

As result, substantial CPU duplication is necessary in order to avoid a crash of the system due to an attempt of the server to handle more transactions than it can manage.

Attempts have been made in the art to deal with this problem but no satisfactory solution has been provided before the present invention. For instance, Smith et al., U.S. Pat. No. 6,308,238, describes an interface device, such as an adapter card, that off loads the server CPU from connection management tasks, and a method of operating it. The adapter card is operationally interposed between an origin server (more specifically the origin server bus) and between the network.

The memory (buffer) allocation and management of Smith is inefficient and is complex. For instance, the memory allocation scheme requires checking, during the step of writing data to buffer (such as an input buffer or an output buffer), whether the buffer is full and if so-allocating another buffer and linking these buffers. The implementation of this memory allocation scheme can be quite complicated, especially when it has to be done on-the-fly and when a large amount of buffers are involved in the process. Furthermore the data requests are provided to the data server "as is" and the origin server responses are stored "as is". As the length of the request, and more especially the length of the response is not known a-priori, and as these length may vary within a wide range that spans from a few bytes to thousands and even millions of bytes, the memory allocation may result in an unexpected termination (due to shortage in available memory space), and is prone to additional problems, such as being unfair and being susceptible to head of the line blocking. For example, when handling a response that is very long, many other requests for receiving responses that turn out to be much shorter may starve.

Thus, solutions of the type proposed by Smith do not efficaciously solve the problems that are addressed by the present invention.

It is an object of the present invention to provide a method and apparatus that overcomes the drawbacks of the prior art.

It is another object of the invention to provide a method and an apparatus which efficiently exploit a relatively small number of continuously open connections, while allowing for the opening and closure of connections according to operational conditions.

It is a further object of the invention to provide a method and an apparatus, which efficiently manage data transfer between a plurality of clients and a server by managing the number of open connections according to the number of requests being submitted to the server.

It is yet another object of the invention to provide a method and an apparatus which efficiently manage data transfer between a plurality of clients and a server by limiting the amount of data that a server is allowed to forward to client in response to a Request, at any given time.

It is still another object of the invention to provide a method and an apparatus which solve the "head-of-line blocking" problem which is common to servers operated according to the prior art.

DEFINITIONS

The invention, as will be apparent to the skilled person from the description to follow, can be exploited in a variety of networks and with a variety of communication protocols. Some such methods and protocols will be briefly reviewed below, and will be referred to as examples in the description to follow, it being understood that such review and description are provided only as background and in order to illustrate the inventions, and that the invention is not intended to be limited to any particular type of network, connection or communication protocol.

The HTTP protocol is a commonly utilized request/response protocol. The information transferred as the payload of a request or response is termed "entity". An entity consists of metainformation in the form of entity-header fields and content in the form of an entity-body. A HTTP communication request is usually initiated by a user agent and consists of a request to be applied to a resource on some origin server. In such a case the metainformation may include various details, such as request method, URL, protocol version, client information, request modifiers, and the like. The server usually responds by sending a response. The response usually includes a status line (including details such as the message's protocol version and a success or error code, server information), entity metainformation, and possible entity-body content.

HTTP protocol includes various methods for retrieving information from origin servers. A partial GET requests that only part of the entity be transferred; the part is defined by the Range header field which is included in the GET request.

Uniform Resource Locator (URL) is a reference or address to resource on the Internet. The resource is usually a file, but this is not necessarily so. A URL includes a protocol identifier (such as http—denoting that the protocol is HTTP), and a resource name. In many cases multiple groups of data servers are accessed by a single URL. Load balancing between the multiple data server groups and between the servers of each group may be based upon information (usually high communication layer information) that includes HTTP request content, client address, and may be further based upon a client cookie.

The Transmission Control Protocol (TCP) is intended for use as a highly reliable host-to-host protocol between hosts in packet-switched computer communication networks, and in interconnected systems of such networks.

Today, communications over TCP/IP typically require copy operations, which add latency and consume significant CPU and memory resources. The Remote Direct Memory Access Protocol (RDMA or RDMAP) enables removal of a local application to read or write data on a remote computer's memory with minimal demands on memory bus bandwidth and CPU processing overhead, while preserving memory protection semantic. RDMA is strongly connected to three fabric architectures. All three architectures specify a form of RDMA and have strong similarities. The Virtual Interface (VI) Architecture goal was to specify RDMA capabilities without specifying the underlying transport. The InfiniBand architecture improved upon the RDMA capabilities of VI and specifies an underlying transport and physical layer that are highly optimized for data-center class traffic. RDMA over TCP/IP will specify an RDMA layer that will interoperate over a standard TCP/IP transport layer. RDMA over TCP does not specify a physical layer; it will work over Ethernet, wide area networks (WAN) or any other network where TCP/IP is used.

Socket Direct Protocol (SDP) is a byte-stream transport protocol that closely mimics TCP's stream semantics. SPD utilizes RDMAP's advanced protocol offload, kernel by-pass, and zero copy capabilities. Because of this, SDP can have lower CPU and memory bandwidth utilization when compared to conventional implementation of TCP, while preserving the familiar byte-stream oriented semantics upon which most current network applications depend.

FIG. 1 illustrates a server protocol stack architecture for handling socket-based applications (1) (e.g. HTTP) over socket interface (2), over traditional network stack, i.e. TCP (3), IP (4), Ethernet (5), or over RDMA technology (7), which uses Socket Direct Protocol (SDP) (6) as an upper layer to allow applications to communicate directly with Hardware (HW) based RDMA devices, and Virtual Interface (VI) (9) or Infiniband (10) or TCP/IP as an underlying protocol technology. When VI is selected as the underlying technology, it can use either IP or Ethernet or a Native VI interface for communicating with other entities. When RDMA uses TCP/IP as an underlying technology, additional RDMA sub-layers (8) should be implemented in-order to achieve full interoperability with TCP/IP semantics.

SUMMARY OF THE INVENTION

In one aspect, the invention relates to a method for managing connections between at least one client and at least one data server, said method comprising:
  (a) providing an intermediary connection apparatus comprising connections to a plurality of clients, said apparatus comprising memory buffers and at least one connection to each of said at least one data server(s) being continuously open;
  (b) establishing a client network connection between said apparatus and one of said clients via a network;
  (c) receiving a client request to receive a response from a data server over said client network connection;
  (d) forwarding to the data server either a request or a partial request;
  (e) limiting the size of the response or partial response that the server is allowed to provide at a given time to said apparatus in response to said client request; and
  (f) buffering data encoding requests and responses in said apparatus according to data traffic load over the connection to said server and to said client, respectively.

According to a preferred embodiment of the invention the method further comprises a step of generating and forwarding partial requests until an entire request is sent to the data server.

According to a preferred embodiment of the invention said buffering comprises allocating downstream memory space to store a partial response of a data server to the partial request.

Memory space can be allocated in a variety of ways. For instance, the downstream memory space can be allocated in response to the size limitation. In a preferred embodiment of the invention the step of allocating downstream memory space is followed by a step of receiving the partial response and storing the partial response in the allocated downstream memory space.

According to a preferred embodiment of the invention, step (d) detailed above is followed by a step of transmitting a partial response over the network connection with the client which, if desired, can also be preceded by a step of converting the partial response to conceal the conversion of the request to multiple partial requests.

The steps of transmitting a partial request and determining whether to generate and transmit an additional partial request until all the multiple partial requests are transmitted are, of course, repeated as needed.

The step of receiving the client request may comprise a step of allocating an upstream memory space to store the said request.

There is no limitation to the type of server connection that can be employed and the invention is meant to encompass all and every suitable connection types that are existing or will be developed. Illustrative and non-limitative examples of such connections include TCP/IP, RDMA over Infiniband or RDMA over TCP/IP compliant.

The invention is also directed to a system for managing connections between at least one client and at least one data server, said system comprising:
  an input interface;
  an output interface;
  a memory space;
  HW processing entities, coupled to the input interface, output interface and memory space and a software control unit operable to:
    (a) Establish a client network connection with one of said clients via a network and via the input interface;
    (b) Receive a client request to receive a response from a data server over said network connection;
    (c) Determine whether the client request has to be converted to multiple partial requests, according to a criterion based on at least one parameter comprising a size limitation;
    (d) Determine whether additional connections with the server have to be opened;
    (e) Determine the size limitation that must be imposed to the server for the response to the request; and
    (f) Forward to the data server, via the output interface, either a request or a partial request.
    (g) Determine whether the whole response has been received from the server to schedule additional request on the connection.
    (h) Determine whether the system buffer associated with a client reached its lower threshold, and if required, schedule the next partial request with the server.

BRIEF DESCRIPTION OF THE INVENTION

The foregoing and other objects, features, and advantages of the present invention will become more apparent from the following detailed description of preferred embodiment, with reference to the appended drawings.

In the drawings, similar reference characters denote similar elements throughout the different views in which.

DETAILED DESCRIPTION OF THE INVENTION

For the sake of simplicity, the description below relates explicitly to TCP/IP, RDMA over TCP/IP, SDP and HTTP communication protocols and to Infiniband architecture (including RDMA interface, I/O switch fabric). The modifications needed to apply the methods described below to the case of other communication protocols, other architectures, and other interfaces will be apparent to those skilled in the art.

For the sake of simplicity it is assumed that a client requests data ("data request") from a data server and that a server responds ("data response") by sending data. The modifications needed to apply the methods described below to other types of requests to be applied to a resource of a data server, such as but not limited to metainformation exchange, other HTTP requests, methods and other protocols, such as but not limited to FTP, can be fully determined by persons skilled in the art.

The term "client request" or "request" may be a request to retrieve information, data, entity, metainformation or any request that is to be applied to a resource on some data server. The "client request" or "request" is answered by a "response" or a "server response". The term "partial client request" or "partial request" is a request to receive a part of the "response" or "server response". A "partial client request" or a "partial request" is answered by a "partial response" or "partial server response".

The term RDMA, refers to RDMA connection which uses SDP layer as an interface to the upper layer protocols, and runs over TCP/IP or Infiniband (IB) fabrics.

DETAILED DESCRIPTION OF PREFERRED EMBODIMENTS

Figure 1:
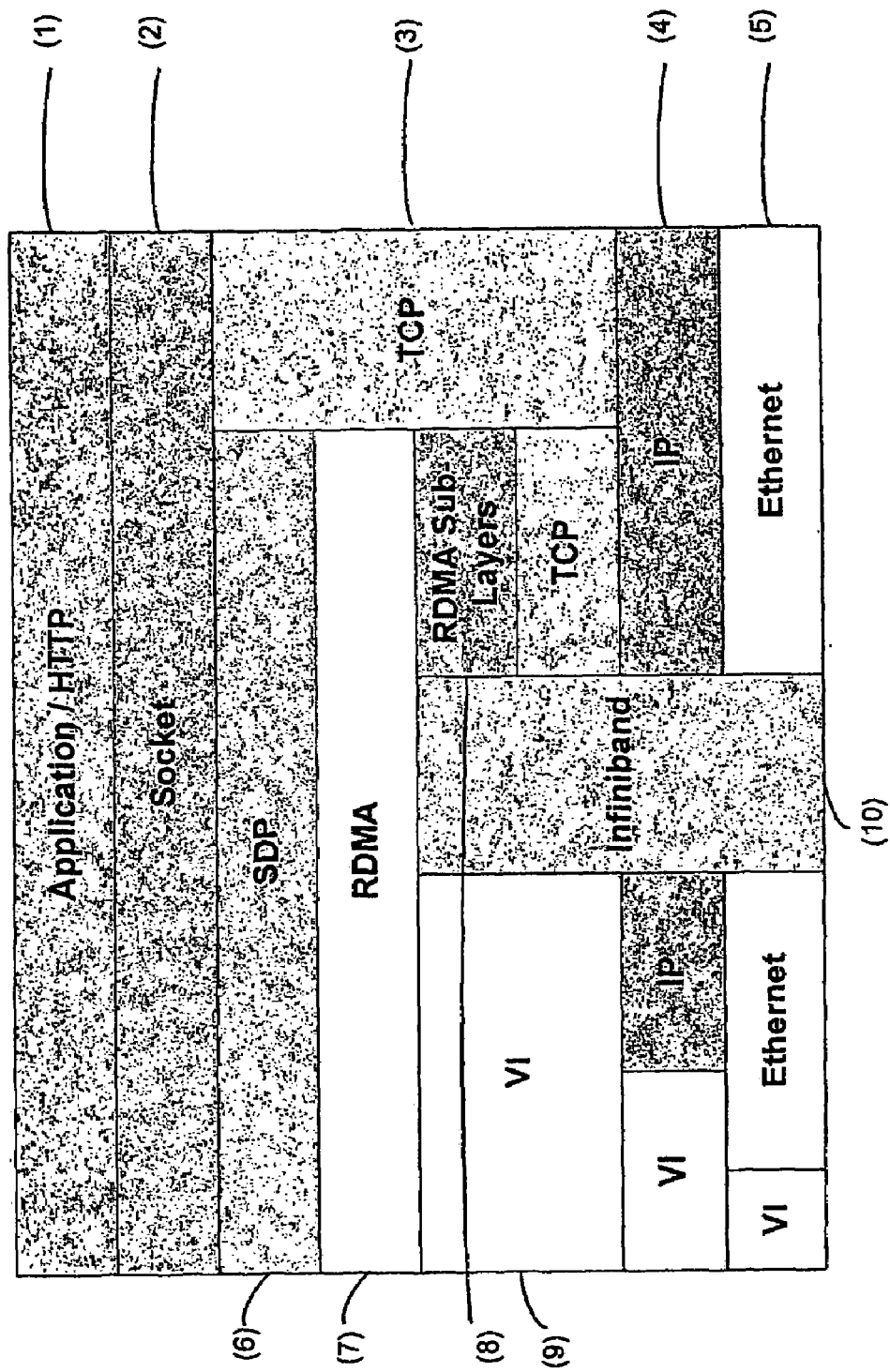
FIG. 1 illustrates a server protocol stack architecture, for handling socket-based applications.
Figure 2:
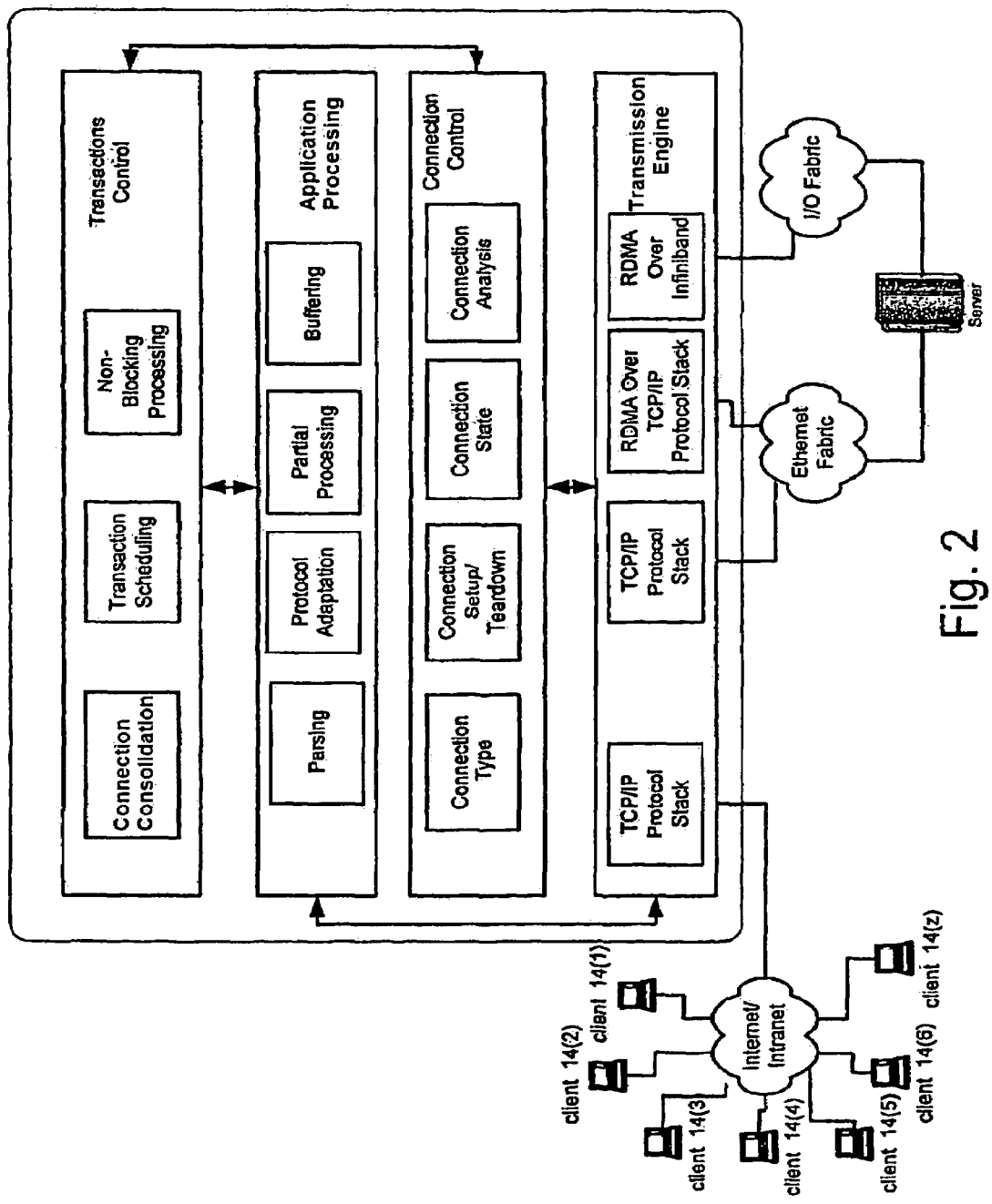
FIG. 2 illustrates the environment of a system for managing network connections between clients and at least one data server in accordance with the functional layers of the invention.
Figure 2A:
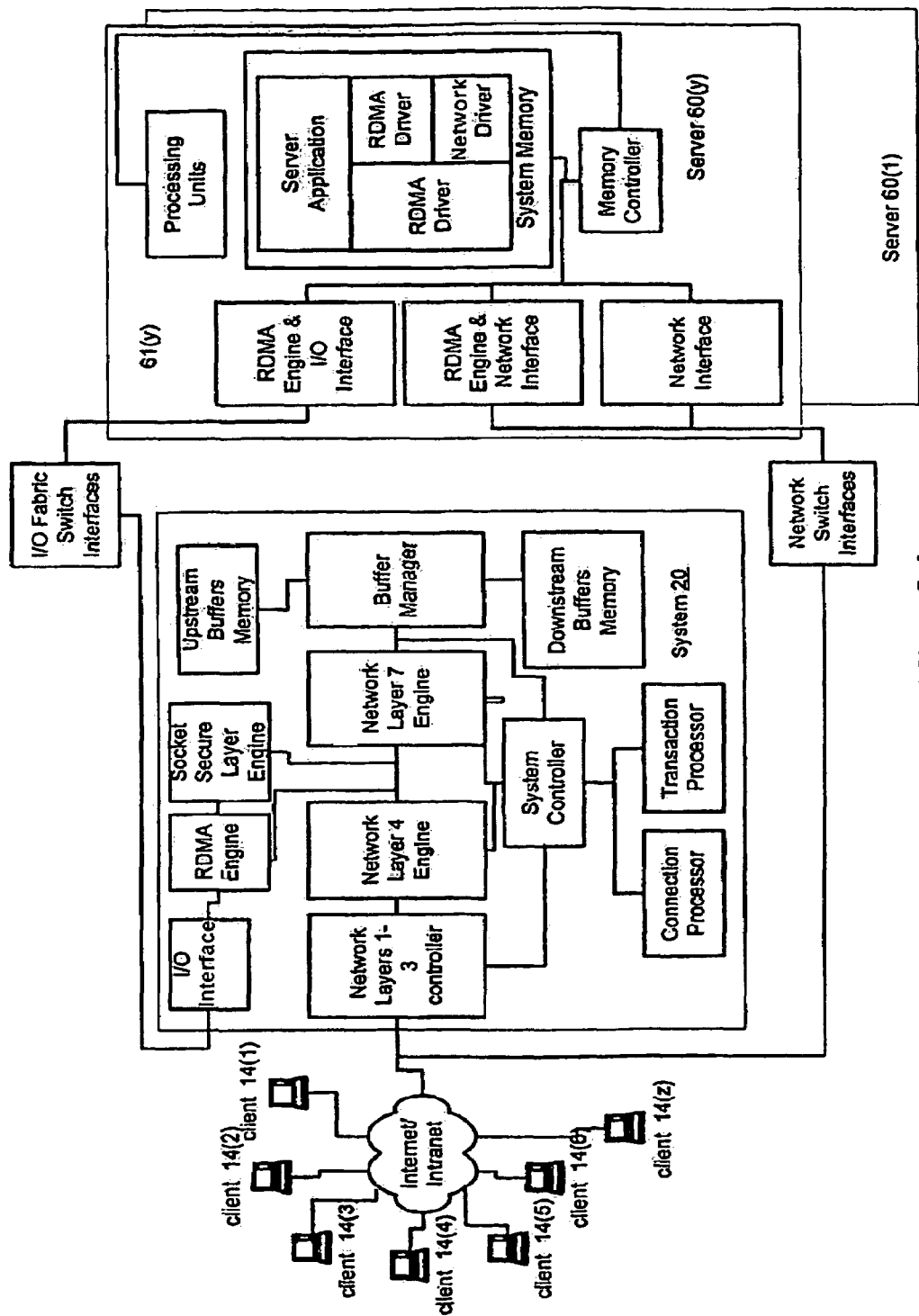
FIG. 2A illustrates the environment of a system for managing network connections between clients and at least one data server, in accordance to a preferred embodiment of the invention.

FIG. 2A illustrates the environment of a system 20 for managing network connections between clients and at least one data server. System 20 is connected to multiple clients, such as 14(1)-14(z) (collectively denoted clients 14) over at least one communication network, over which network connections may be established which often—but not necessarily—is a slow connection. These networks may include the Internet Wide Area Networks, or the Intranet Local Area Networks and the like.

The term 'slow' is meant to indicate that the amount of time that is required to deliver a data payload from a client, such as client 14(z), to system 20 (or from the system 20 to the client 14(z)) is much longer (i.e., of the order of 10 to 1,000,000) than the time that is required to deliver the same data payload from system 20 to a data server, such as data server 60(y). The time difference may result from either software and/or hardware limitations, such as maximal data rate of the communication link, physical distance between system 20, clients 14 and servers 60, communication line reliability, acknowledge mechanisms, communication protocol overheads and the like. Usually, the slow network connections are much more error prone and require communication protocol error correction layers, thus increasing the overall overhead. Servers 60 are operatively connected to system 20 via multiple fast communication networks, buses and the like.

System 20 includes a mixture of software and hardware components that are coordinated in order to communicate with clients on one hand and to communicate with the at least one server on the other hand. The software components includes Connection Processor and Transaction Processor Applications, that are executed by the hardware components, and used to establish and manage persistent connections between System 20 and the at least one data server, and to dynamically establish, manage and analyze network connections between System 20 and the clients. The results of the analysis enables the Connection Management application to convert a request for receiving data (such as a file, a picture and the like) to at least one partial request to receive a portion of the data from a data server. The data server responds to the partial request by downstream transmission of a partial response that includes the requested portion. The partial request imposes size limitation upon the partial response. The size limitations are responsive to a size parameter. The size parameter is responsive to at least one parameter of the client network connection, such as an amount of information that may be provided to a client over the client network connection, during a predefined time period. The predefined time period is selected such as to prevent buffer allocation waste on one hand and to prevent overdue amount of partial requests. Buffer allocation waste may result from storing a partial response within a buffer for too much time, while overdue amount of partial requests may result from allocating a small amount of memory space for each partial response, and thus enforcing generation of an excessive amount of partial requests per request.

The analysis of client network connections may provide an optimal data rate for providing data to the client, whereas this data rate may be determined by communication link limitations, amount of clients that share the communication link, client software and/or hardware storage and/or processing limitations and the like. Conveniently, System 20 determines the size of a data buffer that is allocated for a client such as to balance the amount of data that may be supplied to the client on one hand and the amount of data that is retrieved from the data server, on the other hand.

It is noted that a default size limitation may be selected in various cases, such as prior to the analysis of the client network connections. The default size limitation may be replaced by more accurate size parameters once the analysis is completed. The analysis may be conducted during the operation of system 20 (either routinely, in response to events, and the like) and the size limitations may be updated respectfully).

According to an aspect of the invention system 20 is coupled to multiple data servers 60, over communication links that are associated with distinct service levels. System 20 is operable to route a partial request according to various parameters such as load balancing schemes, the priority of partial request, the ability of a certain data server to properly response to the partial request, and the like.

System 20 includes an input interface (for interfacing with multiple clients), an output interface (for interfacing with data servers), in some cases these I/O interfaces can share both receive/transmit data to/from the clients as well as receive/transmit data to/from the server, a processing entity that includes hardware and software components and a memory space for storing code and information.

System 20 also includes a buffer space (i.e., upstream buffers and downstream buffers) for storing data that reflects requests, partial requests, partial response and responses. The buffer space enables the partition of request to at least one partial request and enables many network connections to be open with clients, while a relatively few connections are open to the server.

Conveniently, the data server is not aware of the partition of a request to at least one partial request, and treats each partial request as independent one, thus the connection is "closed" each time a partial response is transmitted from the server. Usually, two consecutive partial responses related to a single client are separated by multiple partial responses related to other clients.

FIG. 2 schematically illustrates the management of system network connections between clients and at least one data server as carried out by System 20. System 20 includes the following components, which are divided into a control path (white) and a data path (gray) entities:

(1) Transmission Engine--includes various protocol stacks for handling the communication layers with clients and servers:
  (1.a) TCP/IP Protocol stack: used for both clients' and servers' connections.
  (1.b) RDMA Protocol stack, over both TCP/IP and Infiniband Fabrics: In that case additional sub-layers will be implemented such as SDP.
  (1.c) There are various manners to enable TCP/IP and IB connectivity, when RDMA technology is implemented over the Infiniband fabric. These methods include tunneling TCP/IP over Infiniband, although a better method includes TCP termination in which a TCP/IP connection is converted to native SDP over Infiniband connection and vice versa. These communication protocol stacks and conversions are known in the art and do not require additional explanation.

(2) Connection Control—includes specific control functions for handling the clients' and the servers' connections:
  (2.a) Connection Type: used to select the connection type to be implemented with the server for the data transmission.
  (2.b) Connection setup/teardown: Handles the setup and the teardown processes for each connection.
  (2.c) Connection State: used to determine the software or/and the hardware components that should implement the connection according to its state.
  (2.d) Connection Analysis: analyses client's network connection capacity and forward the result to Transaction Control, thus limit the size of the requested file to be sent to the server.

(3) Application Processing—includes the application layer functions for handling the transaction process:
  (3.a) Parsing: used for parsing Request/Response and thereby to determine the boundaries of each transaction.
  (3.b) Protocol adaptation: maps client's protocol to server's protocol and vice versa , e.g. maps HTTP/1.0 to HTTP/1.1.
  (3.c) Partial processing: modifies each request and response according to the file size limitations parameter, determined by the Transactions Control according to the client's network capacity which has been analyzed by the connection control entity.
  (3.d) Buffering: used for dynamically buffering client's requests and server's responses such that requests and responses are buffered once with no need to be internally transferred to another memory space. In this way copy processing is avoided.

(4) Transaction Control—manages the sequence and the flow for each transaction:
  (4.a) Connection Consolidation: maps client's requests to server connections and server's responses to client's connections.
  (4.b) Transaction Scheduling: schedules clients' requests to server connections in a non-blocking way, as follows:
    (4.b.1) by limiting the response size of the client's requests according to the client's network capacity parameters, situations in which a large response blocks a smaller response from being buffered are avoided. In addition, the conversion of said request to multiple partial requests, the provision of said partial requests to the server, the reception of multiple partial responses, and optionally a conversion of the partial responses prior to the transmission to the client such that the client is not aware of the conversion, are efficiently performed.
    (4.b.2) by reserving specific servers' connections to handle only short process requests situations in which a long process request blocks a shorter process request from being executed are avoided. In order to determine the duration of a request, the system analyses the request type (e.g. dynamic or static) and selects the servers' connection accordingly. In addition, a history buffer is maintained for logging the processing parameters per request, per server and according to the frequency of the requests.

According to the preferred embodiment of system 20 illustrated in FIG. 2A, system 20 includes:

An input/output interface, such as Network Layers 1-3 controller, for handling low communication layer processing tasks. For example, in the case of a TCP/IP communication protocol suite, it handles the physical (PHY) layer, Link and Media Access Control (MAC) layer and the Internet Protocol (IP) Layer. If system 20 is connected to a network such as Internet network over Ethernet links then the low communication layers include Ethernet PHY layer, Ethernet Link and MAC layer and IP layer.

Network Layer 4 Engine, that optimizes communication protocol processing tasks for mass number of client network connections, preferably in accordance with the client network connection characteristics. This engine performs protocol reordering tasks, and is responsible for all the network transmissions that are being carried out.

Network Layer 7 Engine is responsible for recognizing the boundaries of requests, partial-requests, and responses (detecting receipt of all the message data), in order to determine when a request is completed, when a series of partial requests that form a request ends, and when a response is completed.

This engine also performs Layer 7 protocol adaptation for optimizing a client's machine to server operation, and is operable to convert requests to partial requests and vice versa, under the control of the transaction processor. Network Layer 7 Engine is further adapted to perform parsing, searching, routing and load-balancing schemes, and to modifying requests, partial-requests, and responses, according to the application content. The operation of parsing and searching may involve a comparison of a received URL (for example: www.crescendo.com) to URLs that were previously stored in a routing table to locate a match to a data server that may be accessed by the Network Layer 7 Engine.

The Buffer Manager uses upstream memory buffers for storing and re-ordering clients' requests. The Downstream memory buffers are used for storing responses and the partial responses from the server.

The transaction Processor is operable to control the following procedures: (i) conversion of requests to partial requests, (ii) transmission of the partial requests to the at least one data server, (iii) reception of partial response from the at least one data server, and (iv) conversion of the partial responses such that the client may read and process the response. Transaction processor controls these procedures in response to various parameters and limitations such as size limitations. The limitations are responsive to an analysis of the client's connection, and especially the bandwidth of said connection, which is performed by a Connection Processor.

The Connection Processor is operable to control the connection setup and teardown processes towards the clients and the servers. The Connection Processor selects the connection type to be applied with the server. The Connection Processor also handles the connections among different hardware components according to the connection state, and it analyzes client's connection bandwidth in order to control the segmentation size of a client's request to multiple partial requests.

The RDMA Engine enables remote transfer of memory content between at least one data server 60 and the buffer memory of system 20. The RDMA operation can be implemented over Infiniband or TCP/IP fabrics.

The Secure Socket Layer (SSL) components allow system 20 to optimize an encrypted data request by decrypting the data, optimizing it and sending it unencrypted or re-encrypted to the server; and when responding: receiving an unencrypted/encrypted response, decrypting if needed and adapting it for the client's connection (i.e. by concatenating multiple partial responses), and encrypting the data before transmitting it to the client.

The system controller is operable to coordinate and manage the operation of the various software and hardware components of system 20. This management enables a non-blocking connectivity between the various hardware components that usually share the same internal bus. System 20 is connected to the at least one data server 60 via an I/O fabric switch interface, a network switch interface, or directly connected, which may be implemented via Input/Output (such as Infiniband-Architecture-compliant) interfaces having switching functionalities.

Measuring Client's Network Bandwidth

According to an aspect of the invention the size of the Buffer memory space is determined in response to the results of a learning sequence during which the client connection bandwidth is determined.

In the following discussion it is assumed that the TCP/IP protocol suite is utilized for transmitting information between a client and system 20. According to the TCP protocol, a data server may transmit over a client connection a certain amount (denoted N) of segments prior to a reception of an acknowledgement signal indicating the reception of the transmitted segments. The amount of transmitted segments is used to determine the size of the memory that is allocated in said Buffer memory space. N' is responsive to the bit rate (B) of the client connection and to the Round Trip Time (RTT) of the client link. RTT is defined as the time period during which a signal is sent from a client towards the data server and is then returned to the client. If the product of B and N' is too small (N'*B<<RTT) then the client connection bandwidth is not fully utilized, as there are gaps between the transmission of the (N)'th segment and the (N'+1)'th segment. If N' is too big, the client connection is overloaded, which usually results in the loss of transmitted segments. In order to find a match between N', B and RTT, various schemes may be adapted, such as the Slow Start scheme, Congestion Avoidance scheme, Fast Recovery scheme, a combination of at least two of said schemes, or another prior art method. It has been surprisingly found, and this is an object of the invention, that a better match between N', RTT and B is achieved when a predefined relationship between an amount of segments that are sent during a first time period ("first sliding window") and an amount of acknowledgement responses received during a second (preferably consecutive) time period ("second sliding window") is maintained.

Conveniently: (i) the time interval of first sliding window substantially equals to the value of RTT, (ii) the amount of segments that are sent during the first time period is increased until a ratio between the amount of acknowledgement signals received during the second sliding window and the amount of the segments transmitted during the corresponding first sliding window reaches a predetermined lower threshold, (iii) after reaching the lower threshold the amount of segments to be transmitted during a first sliding window is decreased in response to the ratio obtained at any given time.

Conveniently, N'*RTT is defined as the client connection bandwidth. As illustrated above, a client request is usually segmented prior to being received by system 20. It is further noted that the client connection bandwidth can be monitored over various time periods to yield statistical information that reflects said bandwidth. The statistical information may reflect the connection bandwidth average (N'*RTT), the connection bandwidth standard deviation (N'*RTT), and the like. Such measurements are known in the art and do not need to be further elaborated.

Following an alternative criterion for slowing down the Congestion Avoidance Window (CWND) and to increase the Slow-Start and the Congestion-Avoidance paradigms (as described in "*TCP Congestion Control*", RFC-2581) in order to avoid the loss segments due to the excess of loading of the network or peer: RTT is normally measured on line in TCP implementations in order to assess an optimal Round-Trip-Timeout (RTO). In a preferred embodiment of the invention the smoothed derivative of the RTT, RTT_deriv_smooth, is also calculated on-line. If the value of RTT_deriv_smooth is positive it means that the network or peer loading constantly increases, and that there is no sense to increase CWND. The exact parameters used for the RTT derivative smoothing and the RTT_deriv_smooth positive threshold should be specifically determined in accordance with the specific environment.

Optimization of the Number of Server Connections

It is known that the server processing is different for a multitude of file types, for example dynamic file requests (generated on the spot) versus static files requests (stored beforehand). This difference may cause a large variation in the response time between the two request types and cause a head of the line congestion.

According to an aspect of the invention, the server may be optimized to process a maximal number of requests by optimizing the number of connections allocated for each type of request. In the following discussion it is assumed that the requests are partitioned into the two groups (but not limited) of requests mentioned above. The present invention provides a method for optimizing the server operation by controlling the number of connections that are allocated to each type of request, or equivalently, by determining the relative priority of a request according to its type according to the defined file request type groups.

By definition, server-optimal operation is reached when the maximal number of requests, corresponding to a defined ratio between requests types, are being served at any given time. This is equivalent to minimizing the aggregate of server service time for all requests. It can be assumed that, unless a server resources congestion point is reached, changing the total number of requests without changing the defined ratio between request types will not change the server operation optimal point. For example, by doubling the number of requests per second that are provided to a server without changing the defined ratio between request types will require doubling the number of connections according to said defined ratio.

It is also assumed that the total number of connections required for an optimal operation should be kept as low as possible (less connection handling time), but on the other hand it should be kept above some minimum value that provides that the connection throughput, or data buffering will be the bottleneck of the service. On the other hand, closing and opening connections frequently introduces some additional load on the server, therefore the closing or the opening of connections should be avoided as possible. Therefore, it is assumed that the optimal number of connections is proportional to the actual load.

The proposed process of the invention measures the actual request service time and then determines the minimal average service time as a function of the number of open connections for each request group type. The minimization parameter is defined as follows:

$$\Im = \frac{1}{N}\sum_{i=1}^{N} \tau_i$$

Where $\tau_i$ denotes the server service time and N is the number of requests presented to the server within a given interval. The value of $\Im$ depends on many factors as mentioned herein before. This value is minimized utilizing two decoupled variables:

$R_m$—for each type m, the ratio between the number of allocated connections for serving request from type m and the total number of connections concurrently available, $M_c$; and $M_c$—the total number of connections concurrently available for the server.

Both variables are continuously changing during operation and therefore their values are continuously averaged during the measurements.

The process includes the following steps:
1. Minimum parameter collection:

The number of connections per request type is assumed to be limited between the predetermined values, $C_{min}$ and $C_{max}$. For each request type m, a vector of values Stime[m] ($C_{min}$, $C_{min+1}$, . . . , $C_{max}$)=(ST$^m$($C_{min}$), ST$^m$($C_{min+1}$), . . . , ST$^m$ ($C_{max}$)) is maintained, which represents the aggregate server service time per request type and per the current number of active connections associated with that type. In parallel: Rcount[m] ($C_{min}$, $C_{min+1}$, . . . , $C_{max}$)=(RC$^m$($C_{min}$), RC$^m$ ($C^{min+1}$), . . . , RC$^m$($C_{max}$)) is maintained, which represents the respective serviced requests count (there are M vectors of STime and Rcount, where M is the number of different request types, m=1, 2, . . . , M).

2. During a T sec collection interval:

For each request of arbitrary type m the time $\tau$, elapsed since the arrival of the request and the completion of the response, is measured. The current number of active connections that are associated with requests of type m, "Cm(i)", is retrieved and $\tau$ is added to the corresponding element ST$^m$ ($C_{m(i)}$), (which has its index value=Cm(i)) in the vector Stime [m]($C_{min}$, $C_{min+1}$, . . . , $C_{max}$). In parallel, the corresponding element RC$^m$($C_{m(i)}$), in Rcount[m]($C_{min}$, $C_{min+1}$,... , $C_{max}$) is incremented. The time measurement resolution is defined during the system initialization phase.

3. At the end of T sec interval:

The average service time per vector element (T$^m$(Cm(i))) is calculated $$\overline{T}^m(Cm(i)) = \frac{1}{RC^m(Cm(i))} \times ST^m(Cm(i)),$$

then

The center of the weight is calculated for the minimization parameter utilizing:

$R_m$(T)—the average ratio between the number of connections of type m that were allocated, and the total number of connections available during T interval; and $M_c$(T)—the average number of connections for the specific server during T interval. Subsequently the $R_m$(T) and $M_c$(T) are filtered (smoothing filter) over extended period to smooth out temporal variation in instantaneous value.

4. Update the number of server's connection after T interval:

The following step should be applied after T interval:
If $M_c$(T)>$M_c$:
  Create additional ($M_c$(T)- $M_c$) connections with the server;
  Update the value of $M_c$ to the value of $M_c$(T)
If $M_c$(T)<$M_c$:
  Release (Mc−Mc(T)) connections with the server;
Update the value of $R_m$ to the value of $R_m$(T); and
From the new value of $M_c$, allocate $R_m$ connections for serving requests from type m.

5. Repeats steps 1-4 for the next T interval

Upstream Traffic Environment

Figure 3:
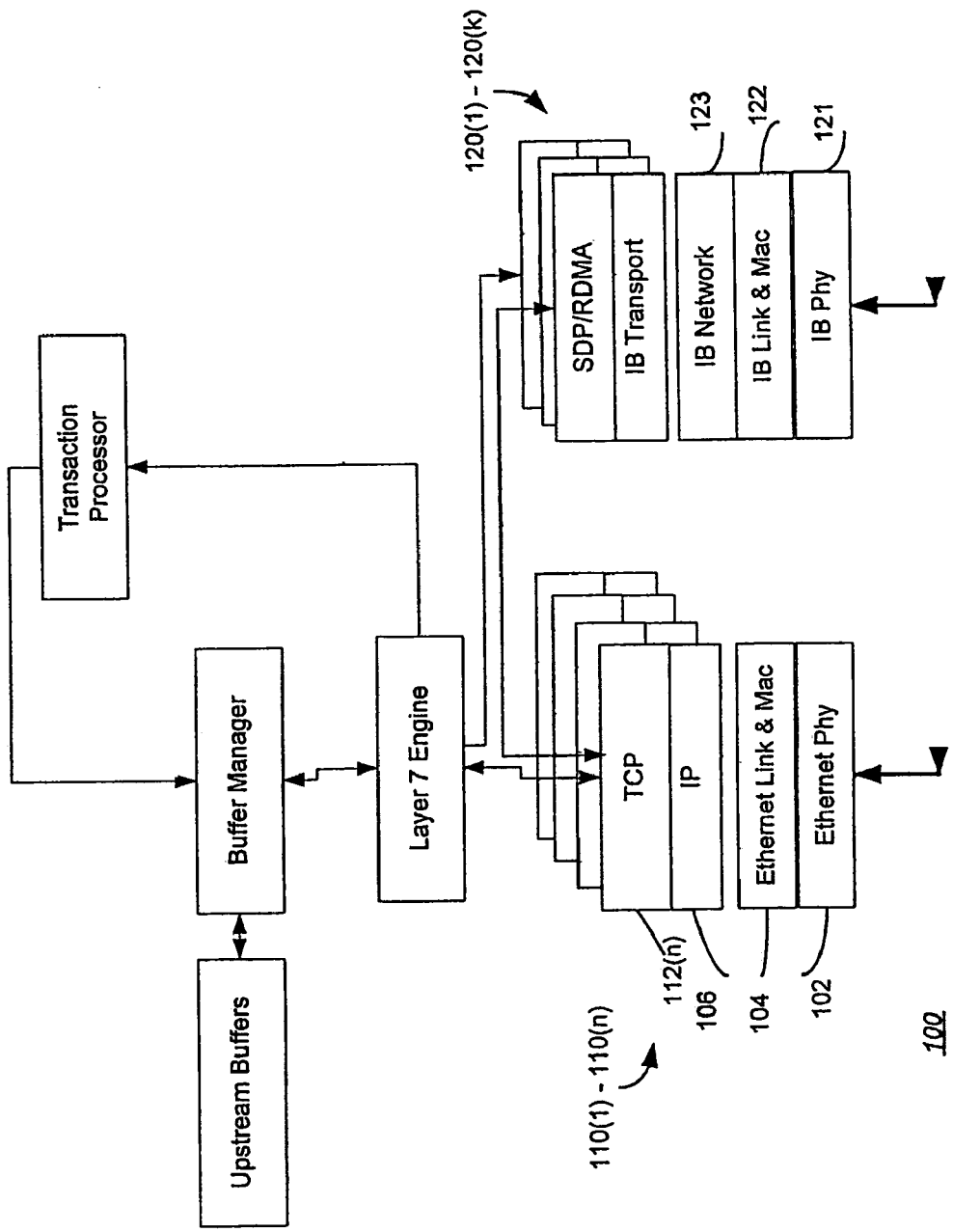
FIG. 3 illustrates an environment that enables upstream traffic flow from clients to the data server, in accordance with a preferred embodiment of the invention.

FIG. 3 illustrates an environment 100 that enables upstream traffic flow from clients to the data server, in accordance with an embodiment of the invention.

Environment 100 includes various hardware, software components and data structures, such as Layer 7 Engine, Transaction Processor, Buffer Manager, Upstream Buffers, TCP/IP instances 110, Ethernet link & MAC layer 104, Ethernet PHY layer 102, SDP/RDMA/Infiniband (IB) transport instances or TCP/IP instances 120, IB network layer 123, IB link & MAC layer 122 and IB PHY layer 121.

Transaction processor is operable to create small amount of persistence TCP and/or RDMA connections (preferably Transaction Mode connections) with the at least one data server during system set-up time. Conveniently, each connection is associated with fabric, e.g. IP or IB, Service Level (SL)

out of a set of multiple fabric Service Levels. It is noted that the various SLs allow an implementation of quality of service (QoS) schemes. QoS are known in the art and may involve a prioritization of a transmission of payload of a high priority over a transmission of a payload of a lower priority. It is further noted that the persistence connections may be refreshed and/or configured during the operation of the system, but this is not necessarily so.

When a client sends upstream information (such as a request), it is received by system 20 as illustrated by Ethernet PHY layer 102, Ethernet link and MAC layer 104, and IP layer 106 of FIG. 3. A client data structure is initiated for each received TCP setup message, as illustrated by TCP/IP instances 112(n). The client data structure is responsible for storing the client network information, such as TCP Control Block (TCB). It is noted that the allocation may be responsive to the clients' network connections parameters, but this is not necessarily so, especially when the client information includes a client request that is usually relatively concise. Conveniently, client request is embedded within TCP segments, and the Layer 7 Engine enables to reconstruct the client request out of the received TCP segments.

When an HTTP request is received the Transaction Processor initializes a sequence of steps that includes:

(i) a handshake step with the Layer 7 Engine to verify the client request boundaries (determine whether an entire client request was received), client request type, (for example—GET request, POST request, SET request and the like);

(ii) a routing decision step (according, but not limited, to one of the following methods—(I) Destination IP and Socket Port; (II) Cookies; and (III) URL) to determine the TCP and/or RDMA connections for sending the partial requests. This determination includes two stages. The first stage includes a selection of the data server and the second a selection of a connection out of a plurality of connections that are concurrently coupled to the selected data server; and (iii) a conversion step of the client request (such as a HTTP Get request) to at least one partial request (such as HTTP Partial Get request). Usually, the parameters of the entire request are stored and a single partial request is generated. After the single partial request is sent and answered then system 20 determines whether to generate a consecutive partial request.

After steps (i)-(iii) are completed the Transaction Processor handles the partial requests and schedules the transmission of partial requests over the selected connection, in response to various parameters such as the partial request priority, whether the partial request is a first request out of a series of partial requests that belongs to the same request, and the like.

According to a preferred embodiment of the invention system 20 is adapted to handle various types of protocols, traffic management and connection management tasks. These connection management tasks include but are not limited to HTTP, pass through connections, security connections and the like. Usually, the handling of a protocol type is done by Layer 4 Engine in response to an identifier (such as a port number) embedded within the client information. The usage of multiple protocols is known in the art.

System 20 is further adapted to handle pass through traffic. Pass through traffic is characterized by creating a connection with the data server, usually during the setup time of system 20. In such a case, transaction processor does not need to handle the transaction, but only needs to create a dedicated connection (such as a TCP connection or a UDP connection) with the data server. In this case, the upstream Network Layer 1-3 Controller will transfer, directly, the incoming data received from the client to the relevant data server. Pass through traffic may be implemented in various cases such as when the client information is not HTTP protocol compliant, when the client information is not TCP communication protocol compliant (such as when using UDP or ICMP communication protocols), or when establishing a server-to-server connection). It is noted that pass through traffic may be handled by establishing a dedicated connection even after the set up time.

Application Data Structures

Figure 4:
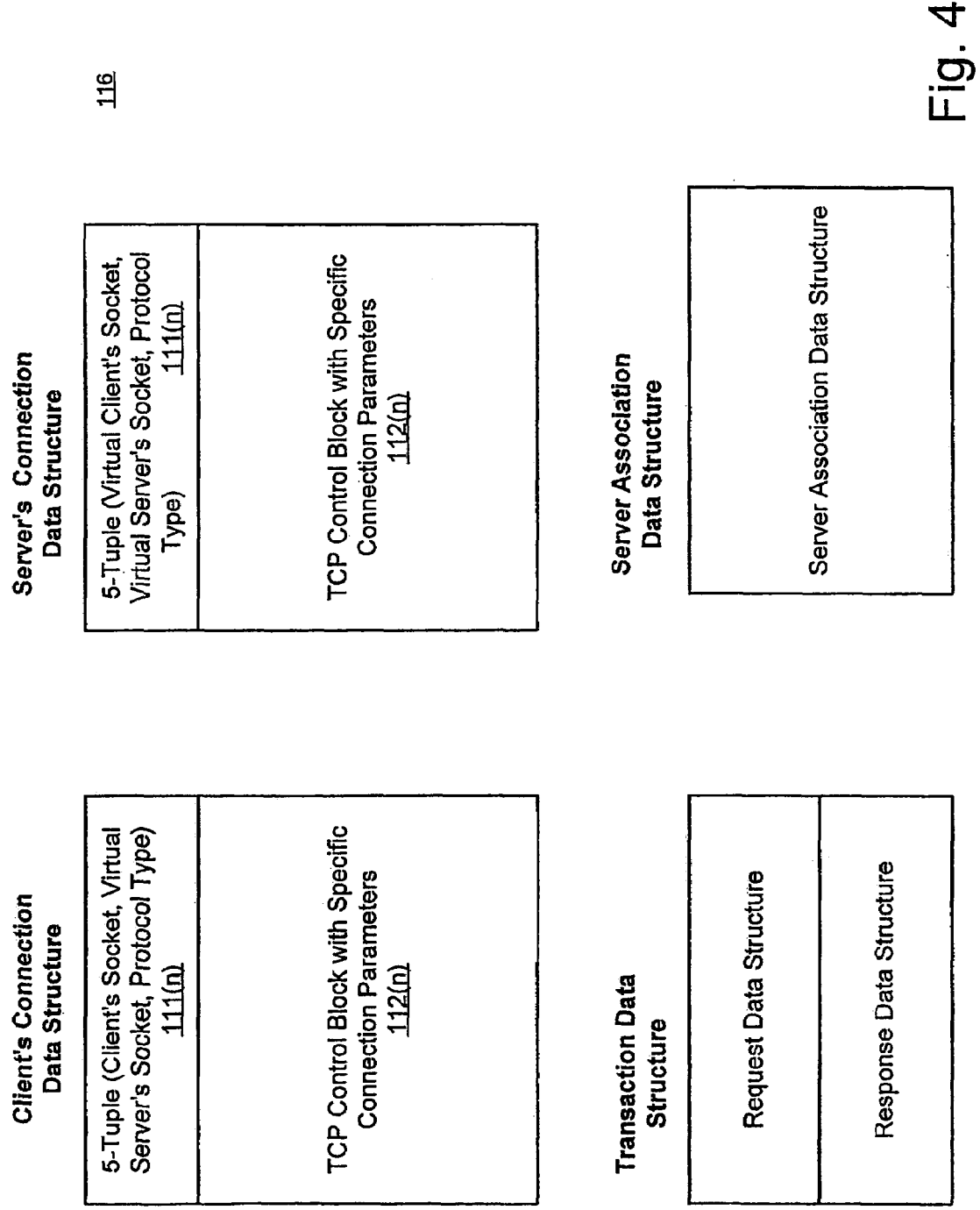
FIG. 4 illustrates a client and a server data structure, out of a plurality of client and server data structures, in accordance with a preferred embodiment of the invention.

FIG. 4 illustrates one client data structure, out of a plurality (n) of client data structures. Client data structure 116(n) includes: (i) A Client's Connection Data Structure, which include 5-Tuple configuration such as Client's IP and Socket Port, system (20)'s Virtual IP and Socket Port, Protocol type, and TCP Control Block (TCB) with specific network parameters to control the bandwidth of each client, (ii) A Server Connection Data Structure, which include 5-Tuple configuration such as system (20)'s IP and Socket Port, server's IP and Socket Port, Protocol Type and TCB, (iii) Transaction Data Structure for controlling request and response parameters, such as versions and methods, (iv) Server Association Table which match between client's requests to server's connections.

Downstream Traffic Environment

Figure 5:
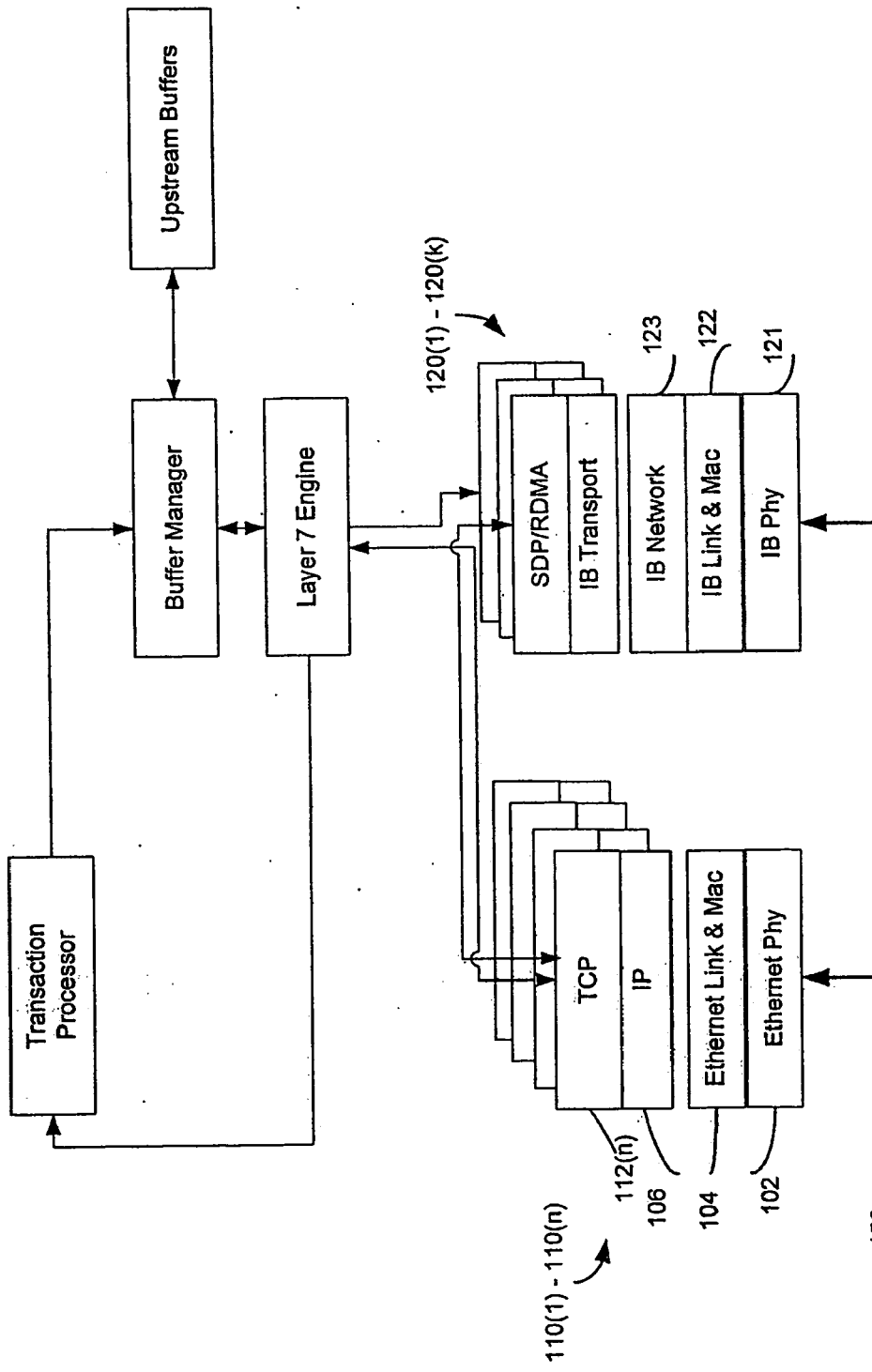
FIG. 5 is a schematic illustration of an environment that enables downstream traffic flow to clients from the data server, in accordance to a preferred embodiment of the invention.

FIG. 5 schematically illustrates the environment 150 that enables downstream traffic flow to clients from the data server, in accordance with a preferred embodiment of the invention. Environment 150 includes various hardware and software components (including some data structures). Environment 150 includes transaction processor that is operable to create small amount of persistence TCP and/or SDP connections with the at least one data server during system set-up time, as illustrated by multiple SDP/RDMA sessions 120 over IB communication protocol stack that includes IB network layer 123, IB link & MAC layer 122 and IB PHY layer 121 and by multiple TCP/IP and/or RDMA/TCP/IP sessions 110 with Etherenet Link MAC 104, and PHY 102.

Downstream environment 150 supports various types of traffic. For example, it supports pass-through traffic and also supports non-pass through traffic that require the management and coordination of system 20. System 20 is symmetrical in the sense that upstream traffic is managed in substantially the same manner as the downstream traffic. Therefore, HTTP downstream type traffic is received by I/O fabric switch interface and RDMA engine, or by Network Layer 1-3 Controller and RDMA over TCP/IP Stack, or by Network Layer 1-3 Controller, and TCP/IP Stack is provided to Layer 7 Engine that updates the connection status, recognizes response boundaries and forwards it to the Buffer Manager that handles the storage of the received downstream data at the downstream buffer space. This update enables system 20 to determine whether it must send additional partial requests in order to retrieve parts of the response that were not yet retrieved. This update may be preceded by ending the series of partial client requests (if the entire request was retrieved from the data server) or is preceded by a generation of a new partial request for retrieving a part of the response that was not yet retrieved.

Each TCP and/or RDMA session manages the transmission of the partial response from the downstream buffer space to the relevant client. As illustrated by layers the partial data response is formatted according to the IP layer, Ethernet Link & MAC layer and Ethernet PHY layer. The memory access to the downstream buffer space is handled by the Buffer Manager.

Method for Managing Connections

Figure 6:
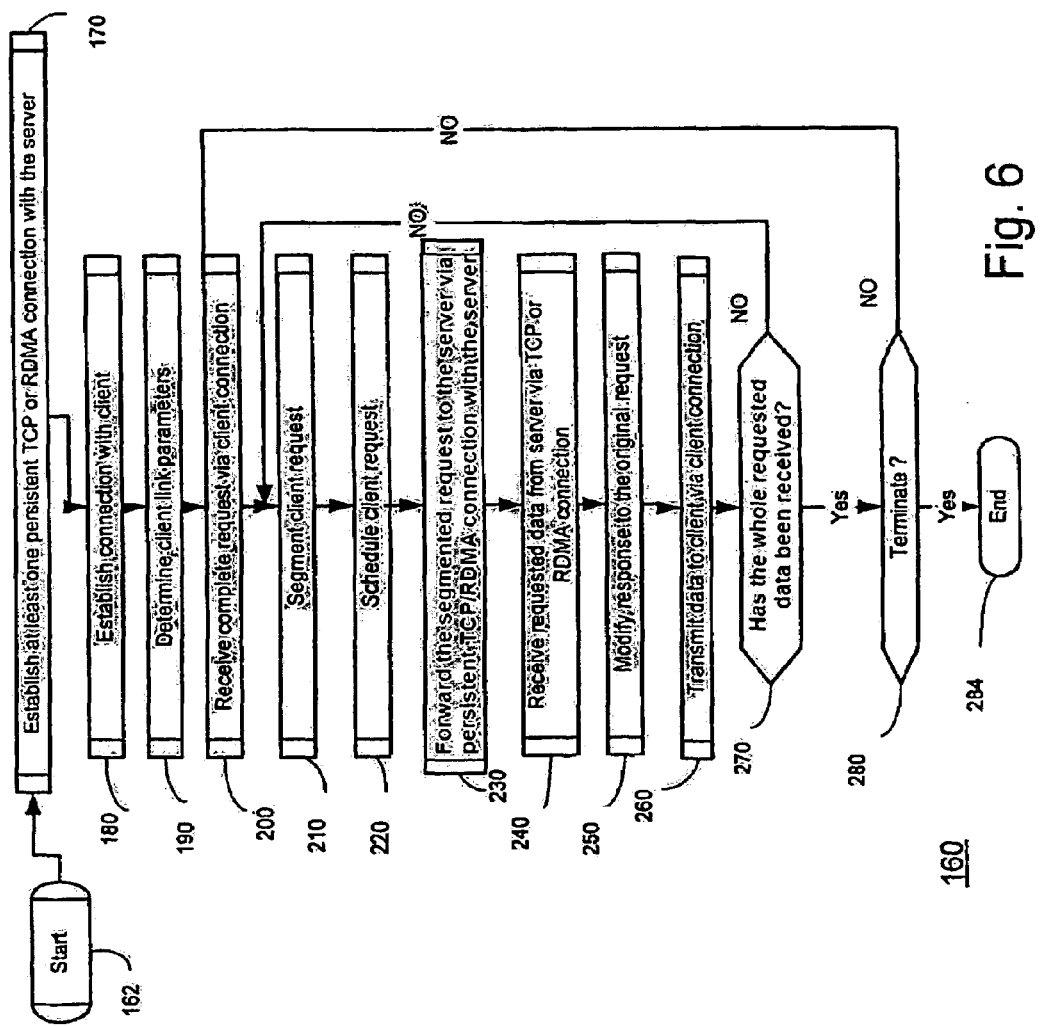
FIGS. 6-15 illustrate a method for managing a connection between a client and a data server, and the steps of said method, in accordance to a preferred embodiment of the invention.

FIG. 6 illustrates a method 160 for managing a connection between a client and a data server, in accordance with a preferred embodiment of the invention.

Method 160 starts by initialization step 162. Step 162 may include initialization sequences, memory space reset, updates and the like.

Figure 7:
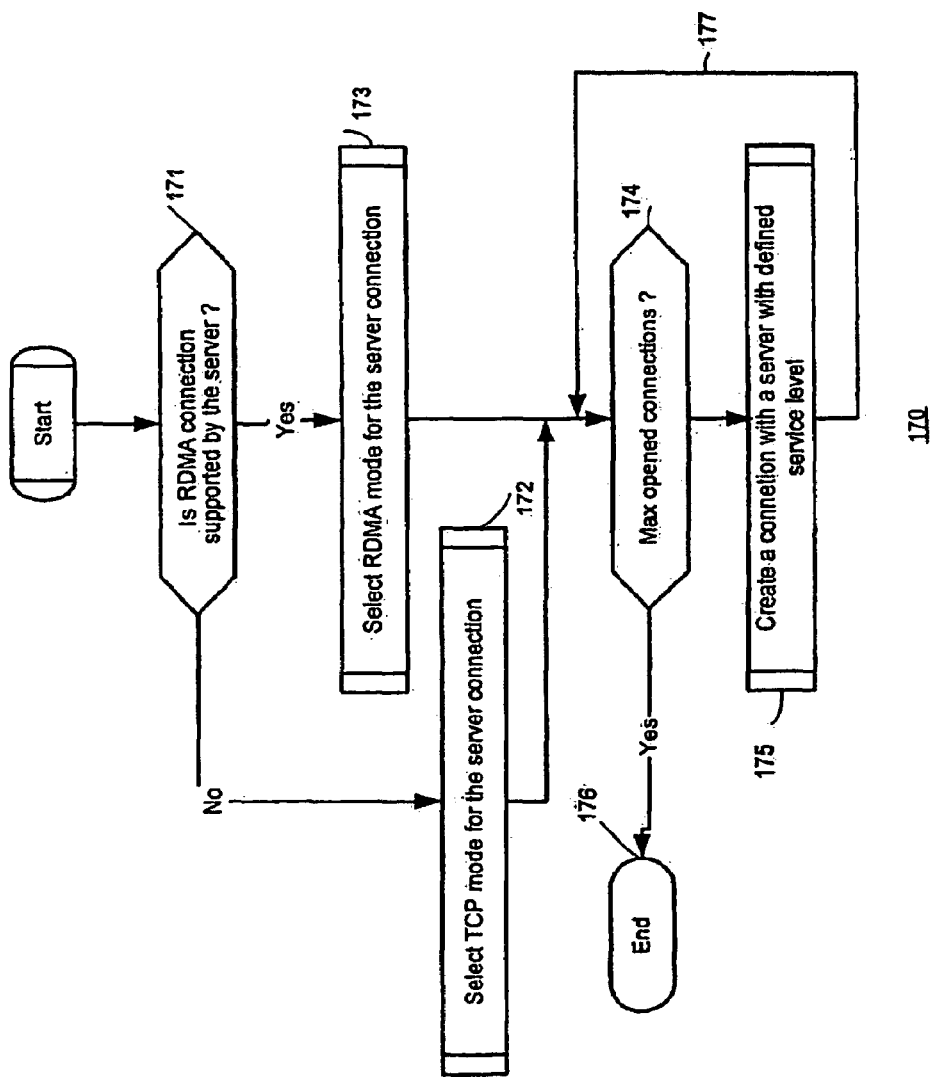

Step 162 is followed by step 170 of establishing persistent TCP and/or RDMA connections with the data servers. As illustrated in FIG. 7, step 170 includes step 171 of selecting TCP or an RDMA mode for the server connection. If an RDMA mode is selected for the server connection, the RMDA type (for example RDMA read or RDMA write modes) for the connection is selected at step 173 (following step 171). Otherwise, the TCP mode is selected for the server connection at step 172. Next, step 174 checks if the maximal amount of connections that can be supported is already opened, and if so, step 175 creates a server connection of the selected type with the data server (if the maximal amount of connections was not previously opened). As illustrated by step 176, the connection is not established if the maximal amount of server connections is already opened. The sequence of establishing server connections may be repeated until the maximal amount of connections is opened, as illustrated by path 177 that connects step 175 to step 174. It is noted that other steps and even other combinations of steps 171-176 may be implemented, as will be appreciated by men skilled in the art.

Figure 8:
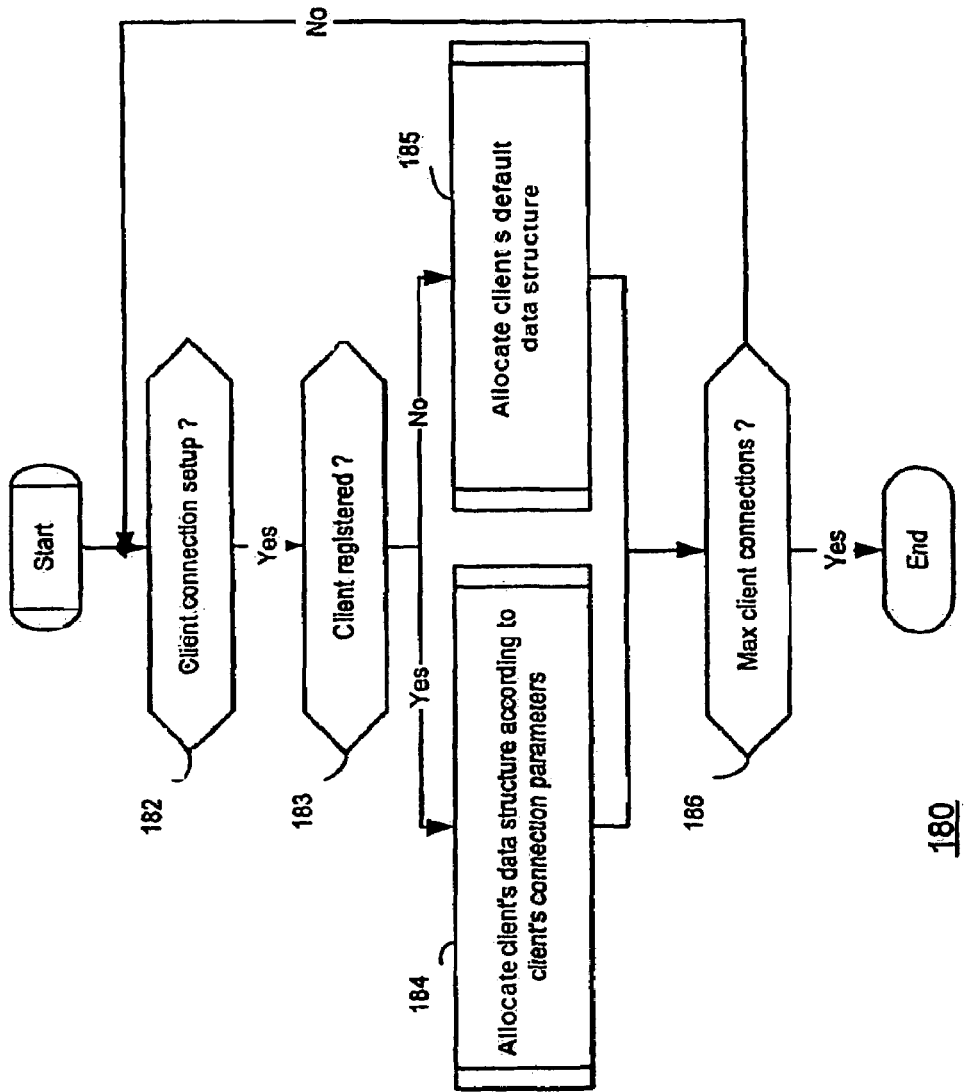

Step 170 is followed by step 180 of establishing a connection with a client. As illustrated by FIG. 8, step 180 includes steps 182-188. Step 182 determines whether the client connection was set up. Step 182 is followed by step 183 of checking whether the client is already registered. If the client was already registered, step 183 is followed by step 184 of allocating a data structure for that client, such as client data structure, in response to the client connection parameters. Else, step 183 is followed by step 185 of allocating a default client data structure to the client connection, which data structure is to be later replaced by a client data structure that is tailored in response to the client connection parameters. Steps 184 and 185 are followed by step 186 of checking whether the maximal amount of client connections are opened and maintained. If the answer is "yes" step 180 ends, else step 180 allows supporting additional client connections.

Figure 9:
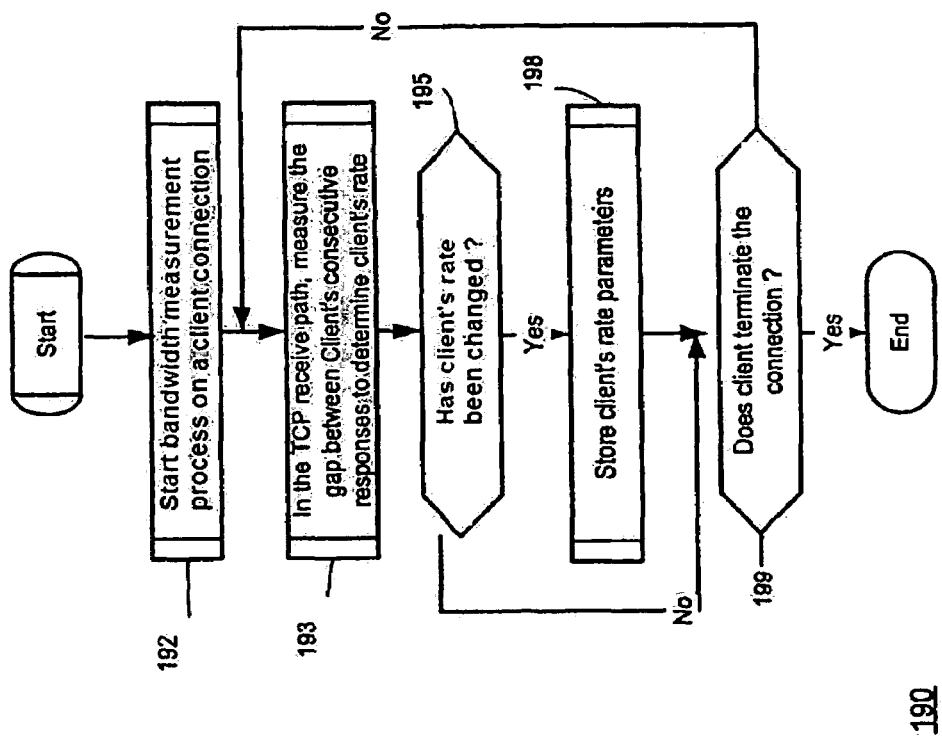

Step 180 is followed by step 190 of determining the client connection parameters. These parameters are utilized for optimizing the storage space memory and the transmission of data from the data servers to system 20 and to the client. Step 190 includes steps 192-199, as illustrated in FIG. 9. Step 192 initializes the analysis of the client connection parameters. Conveniently, Layer 4 Engine performs the analysis. Step 192 is followed by step 193 of determining the client connection parameters, such as by requesting the client to send a sequence of upstream transmissions and measuring the gap between consecutive responses. It is noted that other measurement methods are known in the art and may include parameter determination in response to an identification of the client hardware, communication software or communication link. Step 193 is followed by step 195 of checking whether the measured parameters fit previously stored parameters. It is noted that during a first iteration of step 190, the measurements may be compared to default values or not compared to any values at all. If the client connection parameters match the previously stored parameters then step 195 is followed by step 199, else step 195 is followed by step 198 of storing the updated parameters at a storage space of system 20, such as in client data structure 111/112 (n). Step 198 is followed by step 199 of checking if the client connection terminated. If the answer is yes step 190 ends, else step 199 may be followed by step 193 to enable constant measurement of the client connection parameters. It is noted that the parameter measurement may be repeated in a periodic manner, in response to various events in system 20.

Figure 10:
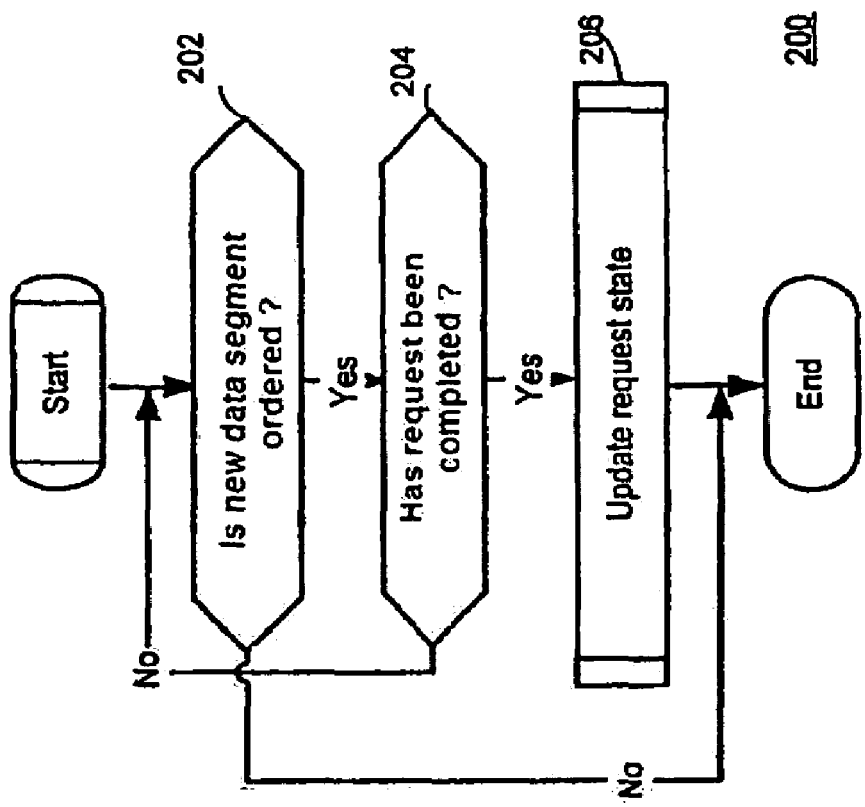

Step 190 is followed by step 200 of receiving a client request via the client connection. Step 200 may be implemented by listening to the client connection and determining whether there is a request to initiate a connection. FIG. 10 illustrates step 200 that includes steps 202 of checking if a new data segment is ordered, step 204 of checking if the entire request was received and step 206 (that follows steps 202 and 204 if both answers are "yes") of updating the request state accordingly. If the answer to step 202 is "no" then step 200 ends, and if the answer to step 204 is "no" it is followed by step 202.

Figure 11:
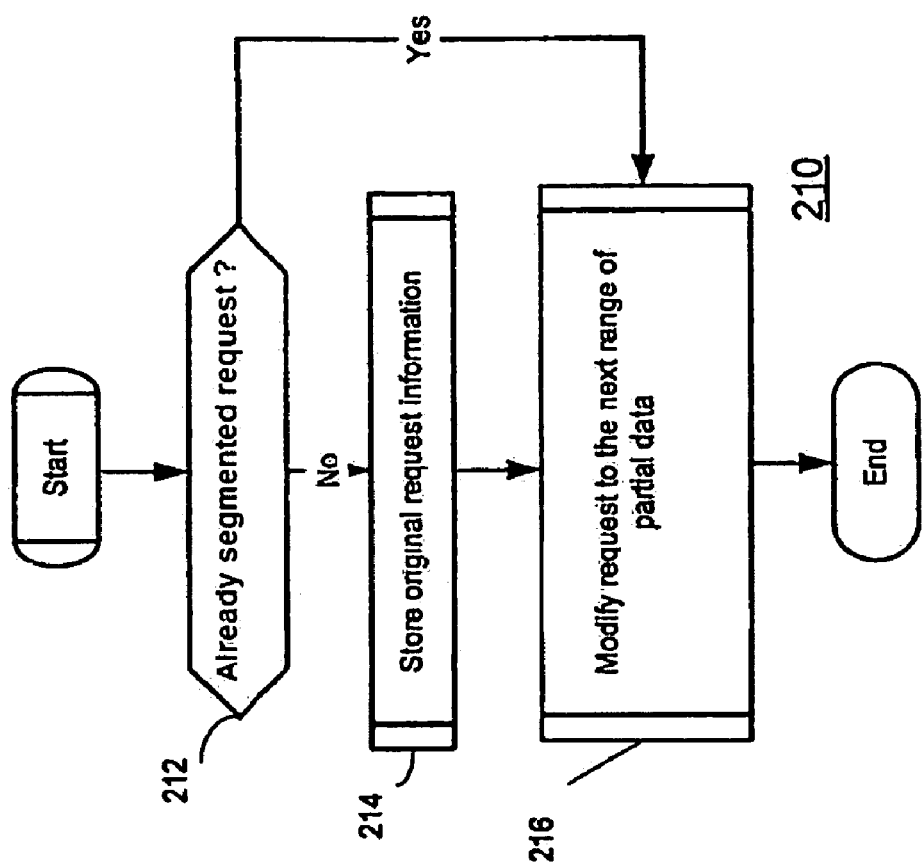

Step 200 is followed by step 210 of generating a partial request(s). Whenever a client request is received, step 210 determines whether to convert it to multiple partial client requests. The determination reflects an estimation of a relationship between size limitations and the size of the response. If the estimated size of the response exceeds the size limitation then the request must be converted to at least two partial requests. The estimation may be based upon a-priori knowledge of the length of the response, or may be a default value, it is noted that method 160 compares received partial response to the request and continues to send partial requests until the entire request is retrieved. As noted before, method 160 treats each partial request as an independent ("atomic") request, and usually does not transmit a consecutive partial request until the client retrieved the previous partial response. Accordingly, two partial responses that relate to the same client connection are usually separated by many partial responses relating to other client requests. Steps 212-216 of FIG. 11 illustrate this process. Step 212 includes checking whether the client request was already converted to partial client data request, step 214 of storing the client request information, such as in client data structure, and step 216 of generating a partial client data request that requests a partial response that was not already retrieved. Step 212 is followed by step 216 if the client request was already converted to partial client data request.

Step 210 is followed by step 220 of scheduling the upstream transmission of the update partial client request. The scheduling scheme may be responsive to load balancing schemes, partial request priority, request type (e.g. request for static or dynamic content), number of connections currently occupied by the server and the like. Conveniently, the first partial request out of multiple partial requests that form a single request is transmitted over a lower priority (lower service level) link than the consecutive partial requests, but this is not necessarily so, as the former link may have the same priority as the latter link. Consecutive partial requests are sent over higher priority links to prevent partial requests of a request that was partially transmitted to a data server from being delayed because a response to another request that was not serviced.

Figure 12:
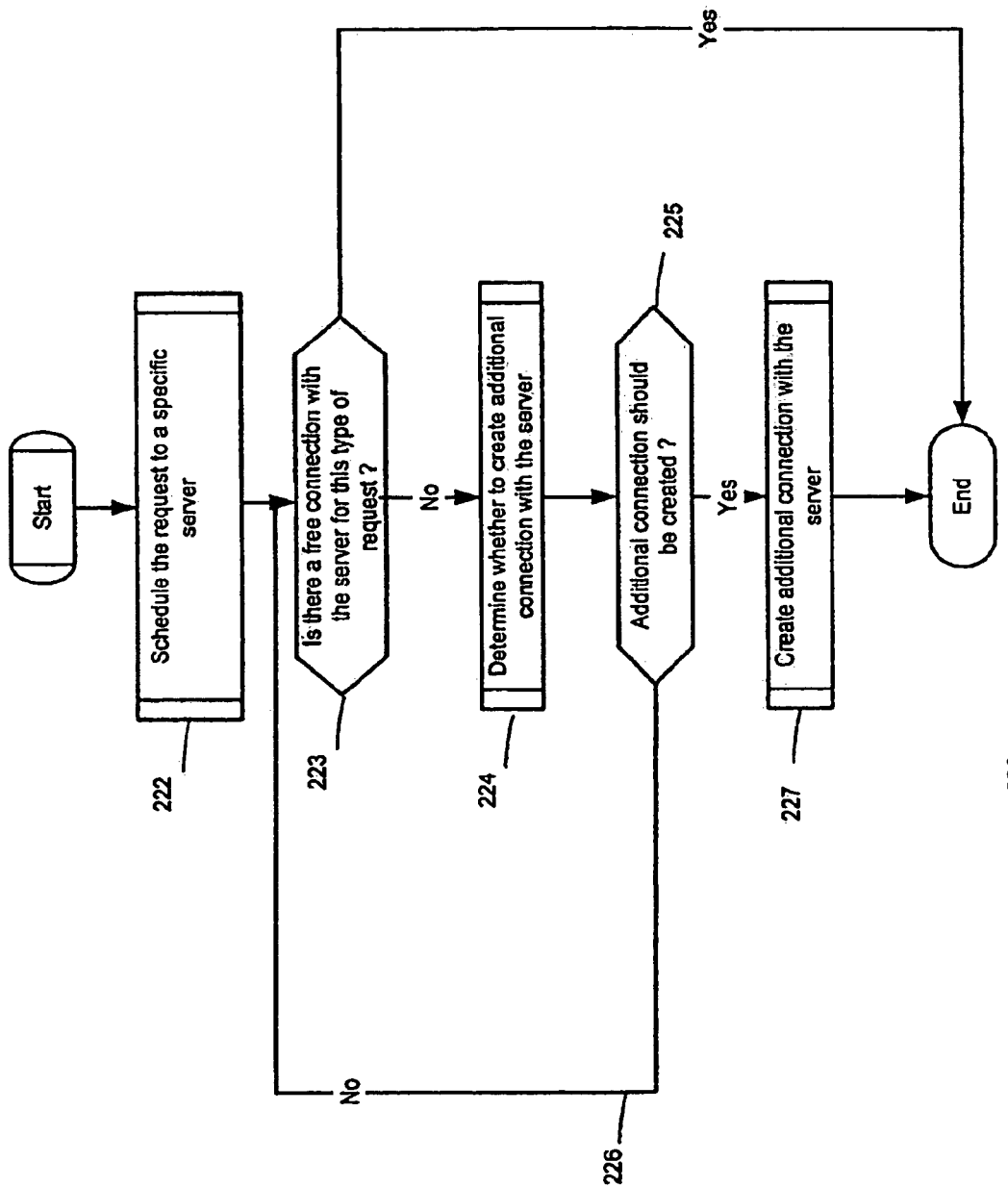

Referring to FIG. 12, step 220 includes step 222 of determining to which data server out of a plurality of data servers to upstream transmit the partial client request. The determination may be responsive to the ability of the data servers to retrieve the requested response, to load balancing parameter, to the number of connections currently occupied by the server, to request priority, to request type (e.g. request for static or dynamic content), to request segment type (i.e. first or non-first segmented request) and the like. Step 222 is followed by step 223 of determining whether there are free connections with the server that can be used for request transmission.

A free connection refers to a connection with no pending requests to be processed by the server, and the type of the connections is correlated with the type of the requests to be sent. If a free connection exits, step 223 is followed by step 230 which forwards the request to the server according to the connection type, i.e. TCP or RDMA, otherwise step 223 is followed by step 224 which determines whether to create an additional connection with the server. Detailed description on this process is provided by Server Connection Number Optimization paragraph. Step 224 is followed by step 225, which as a result of step 224 determines whether to create additional connection with the server (step 227), i.e. TCP or RDMA or step 226, which delay the scheduling process for the specific connection until a server's connection becomes free. Such a delay won't reduce server performance, it allows the server to execute client's requests at an optimal speed. Steps 223 and 227 are followed by step 230. Step 220 is followed by step 230 of upstream transmitting the partial client request to the data server via the server connections.

Figure 13:
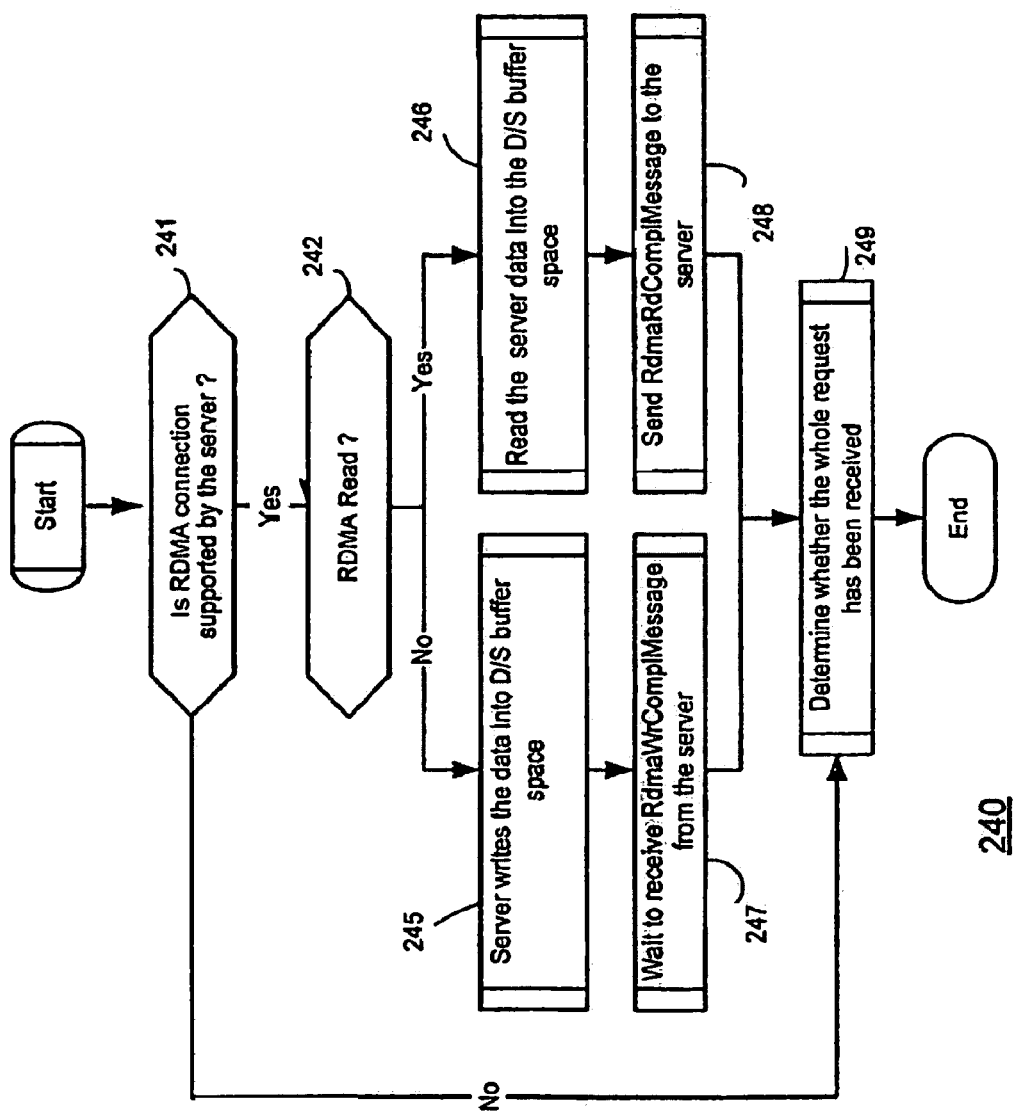

Step 230 is followed by step 240 of receiving a downstream-transmitted partial response from the data server, in response to the upstream-transmitted partial request of step 230. As illustrated by FIG. 13, step 240 includes steps 241 of determining whether the server connection is an RDMA connection or not (i.e. TCP connection), step 242 of determining whether the RMDA mode is RDMA read mode, as the data transfer may be performed under RDMA read mode (in which step 242 is followed by steps 246 and 248) or RDMA write mode (in which step 242 is followed by steps 245 and 247). In RDMA read mode the data server writes a response to a downstream buffer space allocated (step 246). This step is followed by step 248 of sending a RdmaRdComplMessage (step 248) to the data server, and step 249 of determining whether the whole partial response was downstream transmitted. In a RDMA write mode the partial response is fetched (step 245) from the data server into a downstream buffer space allocated for this partial response. This step is followed by step 247 of waiting for RdmaWrComplMessage from the data server, and step 249 of determining whether that whole partial response was downstream transmitted. If TCP protocol is used for server connection, it is determined by step 241 followed by step 249 for determining whether that whole partial response was downstream transmitted. The determination of response complete is based on examining the response data header and the received payload bytes and on comparing them to what was sent by the request. For example, if the request message asked for bytes 1000-2000 of a file, the response header should indicate that bytes 1000-2000 have been received and the number of received payload bytes is 1000.

Figure 14:
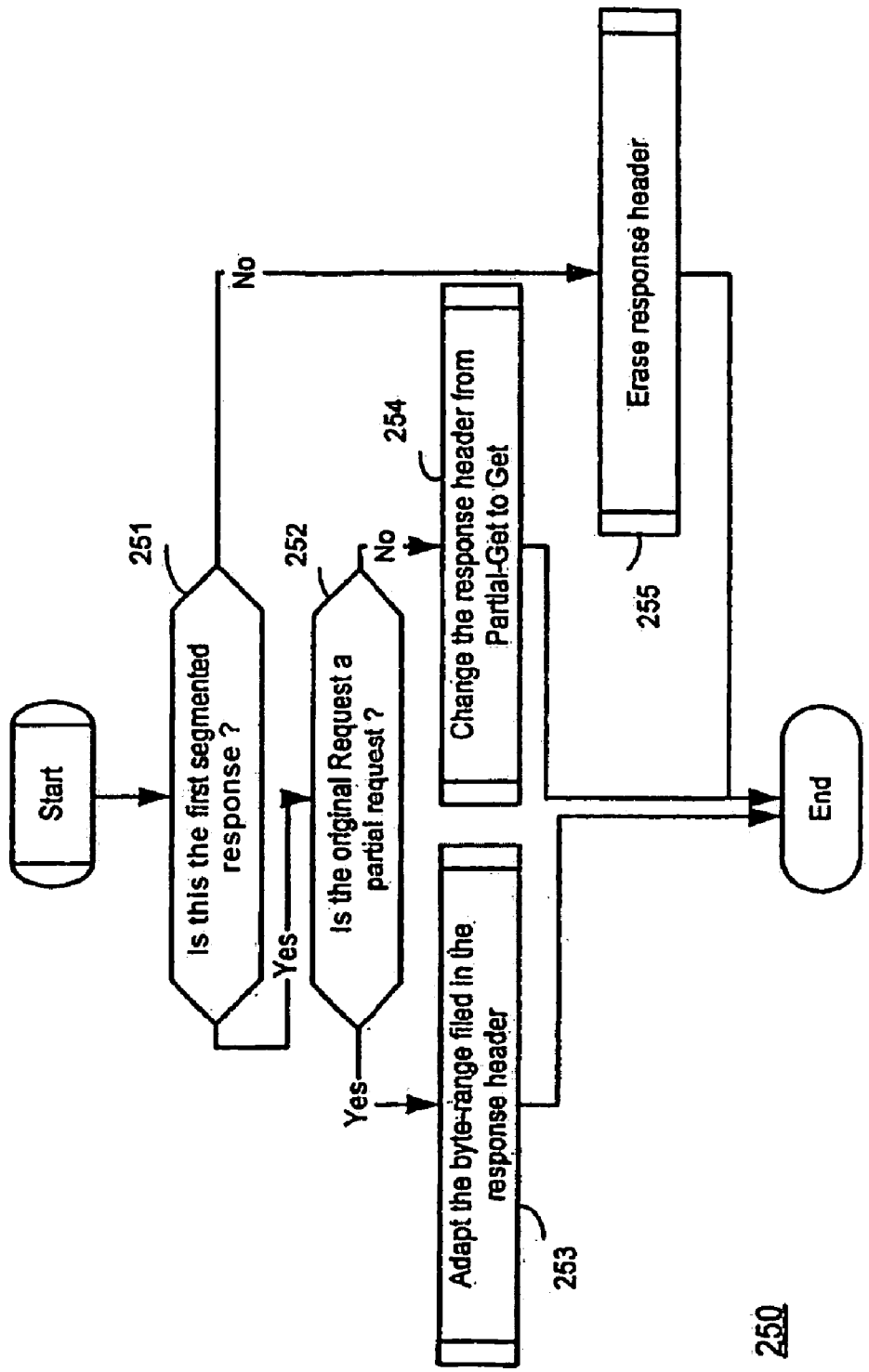

Step 240 is followed by step 250 of modifying the partial response so that the client is not aware of the partition of the request to multiple partial requests. As illustrated by FIG. 14, Step 250 may include step 251 of checking whether the partial response is the first partial response out of a series of partial responses. If the answer is "no" step 251 is followed by step 255 of modifying the partial response by erasing the partial response header. If the answer is "yes" step 251 is followed by step 252 of checking whether the client has originally sent a partial request. If the answer is "yes" step 252 is followed by step 253 of modifying the partial response by updating the byte range in the partial response header if required, else step 252 is followed by step 254 of changing the partial response header from Partial Get to Get. Step 253, 254 and 255 are followed by step 260.

Figure 15:
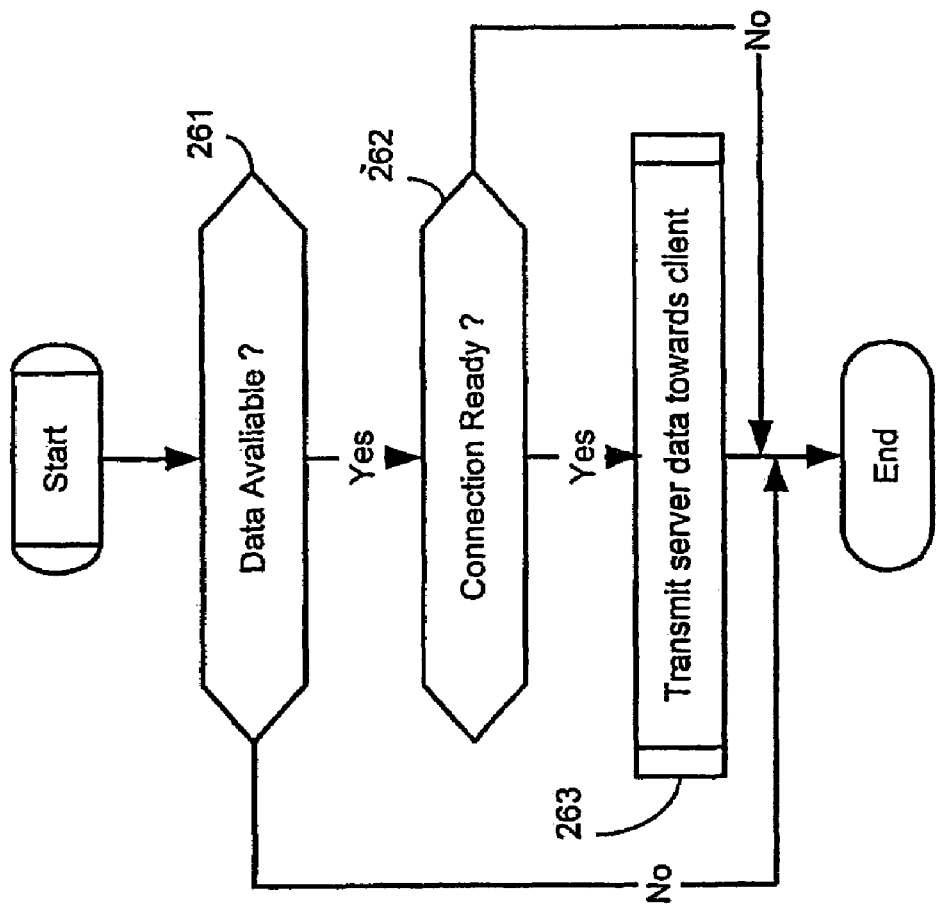

Step 250 is followed by step 260 of downstream transmission of the modified partial response to the requesting client via the client connection. As illustrated in FIG. 15, step 260 includes step 261 of checking whether the partial response is available for transmission. Step 261 is followed by step 262 of determining whether the client connection is ready for transmission, and if so step 262 is followed by step 263 of downstream transmitting the partial response to the client over the client connection. If the client connection is not ready, the transmission is not made. Step 263 triggers step 270 if the downstream buffer threshold is crossed, i.e. in one hand there is enough time to get the next part of the data from the server, on the other hand the downstream buffer won't be overflowed while the next part of the data is being transmitted to system 20.

Step 260 is followed by step 270 of determining whether the entire response was downstream transmitted to the client, and if not so repeating the steps of generating a new partial request, upstream transmitting the partial request, downstream transmitting (and modifying) a partial response continue. If the entire requested data was was downstream transmitted step 270 is followed by query step 280. If there are still remaining partial responses to transmit then step 271 is followed by step 221.

The query of step 280 includes determining whether the client connection is terminated, if so the process of FIG. 16, 160, ends, and if the client connection is not terminated step 280 is followed by step 200 of Receiving Complete Request VIA Client Connection.

It is noted that if the request may be answered by a single response (e.g., there is no need to partition the request and the response) method 160 is implemented without said partition.

Those skilled in the art will readily appreciate that various modifications and changes may be applied to the preferred embodiments of the invention as hereinbefore exemplified without departing from its scope as defined in and by the appended claims.

The invention claimed is:

1. A computer-implemented method for managing connections between at least one client and at least one data server, said method comprising:
   (a) providing an intermediary connection apparatus comprising connections to a plurality of clients over a WAN or a LAN environment, said apparatus comprising memory buffers and at least one connection to each of said at least one data server in a plurality of data servers;
   (b) receiving at said apparatus a client request for a response including an entity from a data server over a client network connection;
   (c) selecting a data server connection through which to upstream transmit the client request by detecting the temporary load on data servers that are capable of responding to the client request;
   (d) determining whether to create an additional connection with the selected data server or to delay sending the client request whenever there is no free connection to be used for sending the client request towards the selected data server, wherein a free connection has no pending requests to be executed by the data server, and that is of the type that corresponds to the type of pending client request;
   (e) determining, at said apparatus, a size limitation on the size of a partial response for a portion of the entity that the selected data server is allowed to provide at a given time to said apparatus in response to said client request, wherein the portion of the entity is less than the whole of the entity;

(f) determining, at said apparatus, whether the client request has to be converted to multiple partial client requests, according to the size limitation for the partial response from the selected data server;

(g) sending from said apparatus to the selected data server, the client request or multiple partial client requests according to scheduling criterion based on at least one parameter comprising: priority, load balancing, number of connections occupied by the selected data server, and request type;

(h) sending from the selected data server connection the partial response over a client network connection according to the size limitation in response to the client request or one of the multiple partial client requests;

(i) generating and forwarding multiple partial client requests until an entire client request is received by the selected data server; and (j) generating and forwarding partial responses until and entire response is sent by the selected data server.

2. The method of claim 1 further comprising allocating downstream memory space to store a partial response of a data sewer to the partial request.

3. The method of claim 2 wherein the downstream memory space is allocated in response to the size limitation.

4. The method of claim 2 wherein step of allocating downstream memory space is followed by a step of receiving the partial response and storing the partial response in the allocated downstream memory space.

5. The method of claim 1 wherein the step of receiving the client request comprises a step of allocating an upstream memory space to store the said request.

6. The method of claim 1 wherein the step of receiving a client request comprises a step of re-ordering out-of order client request segments.

7. The method of claim 1 wherein the server connection is selected from among TCP/IP, RDMA over Infiniband, and RDMA over TCP/IP compliant.

8. The method of claim 1 wherein the partial request is upstream transmitted over a TCP or SDP socket.

9. The method of claim 1 wherein the step of determining whether to create an additional connection is continuously executed until there is no free connection to handle the request.

10. The method of claim 1 wherein the step of determining whether to create an additional connection further determines whether to release a dormant server connection according to the connection type.

11. The method of claim 1 further comprising a step of analyzing the client network connection to determine the size limitation.

12. The method of claim 11 wherein the size limitation is updated in a periodic manner.

13. A system for managing connections between at least one client and at least one data server, said system comprising:
an input interface;
an output interface;
a memory space;
a processing entity, coupled to the input interface, output interface and memory space, the processing entity operable to:
(a) receive a client request for a response including an entity from a data server over a client network connection;
(b) select a data server connection through which to upstream transmit the client request by detecting the temporary load on data servers that are capable of responding to the client request;

(c) determine a size limitation to be imposed on the selected data server for a partial response for a portion of the entity that the selected data server can provide at a given time in response to said client request, wherein the portion of the entity is less than the whole of the entity;

(d) determine whether the client request has to be converted to multiple partial requests, according to a criterion based on at least one parameter comprising the size limitation of the partial response from the selected data server;

(e) determine whether additional connections with the server have to be opened or to delay sending the client request whenever there is no free connection to be used for sending the client request towards the selected data server, wherein a free connection has no pending requests to be executed by the data server, and that is of the type that corresponds to the type of pending client request;

(f) forward to the data server, via the output interface, the client request or multiple partial client requests according to scheduling criterion based on at least one parameter comprising: priority, load balancing, number of connections occupied by the selected data server, and request type;

(g) send from the selected data server connection the partial response over a client network connection according to the size limitation in response to the client request or one of the multiple partial client requests;

(h) generate and forward multiple partial client requests until an entire client request is received by the selected data server; and (i) generate and forward partial responses until and entire response is sent by the selected data server.

14. The system of claim 13 wherein the processing entity is operable to allocate downstream memory space to store a partial response of a data server to the partial request.

15. The system of claim 14 wherein the downstream memory space is allocated in response to the size limitation.

16. The system of claim 14 wherein the processing entity is operable to allocate downstream memory space, receive the partial response via the output interface and to store the partial response in the allocated downstream memory space.

17. The system of claim 13 wherein the processing entity is operable to repeatedly determine whether to generate and transmit an additional partial request until all the multiple partial requests are transmitted.

18. The system of claim 13 wherein the processing entity is operable to transmit a partial request to the data server in response to the transmission of previously received partial responses to the client.

19. The system of claim 13 wherein the processing entity is operable to allocate an upstream memory space to store a client request.

20. The system of claim 19 wherein the reception of a client request comprises a reception of client request segments and a determination of when an entire client request was received.

21. The system of claim 13 wherein the server connection is selected from among TCP/IP, RDMA over Infiniband, and RDMA over TCP/IP compliant.

22. The system of claim 13 wherein the partial request is upstream transmitted over a TCP or SDP socket.

23. The system of claim 13 wherein the selection is responsive to a service level of the partial request.

* * * * *